US012786253B2

(12) United States Patent
Pandit et al.

(10) Patent No.: US 12,786,253 B2
(45) Date of Patent: Nov. 3, 2026

(54) ROBOCALL BLOCKING METHOD AND SYSTEM

(71) Applicants: GEORGIA TECH RESEARCH CORPORATION, Atlanta, GA (US); UNIVERSITY OF GEORGIA RESEARCH FOUNDATION, INC., Athens, GA (US)

(72) Inventors: Sharbani Pandit, Marietta, GA (US); Mustaque Ahamad, Atlanta, GA (US); Roberto Perdisci, Dacula, GA (US); Krishanu Sarker, Marietta, GA (US); Diyi Yang, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 272 days.

(21) Appl. No.: 18/699,099

(22) PCT Filed: Oct. 11, 2022

(86) PCT No.: PCT/US2022/046278

§ 371 (c)(1),
(2) Date: Apr. 5, 2024

(87) PCT Pub. No.: WO2023/064272

PCT Pub. Date: Apr. 20, 2023

(65) Prior Publication Data

US 2024/0406227 A1 Dec. 5, 2024

Related U.S. Application Data

(60) Provisional application No. 63/254,377, filed on Oct. 11, 2021.

(51) Int. Cl.
*H04L 65/1076* (2022.01)
*G10L 15/26* (2006.01)
(Continued)

(52) U.S. Cl.
CPC .......... *H04L 65/1079* (2013.01); *G10L 15/26* (2013.01); *H04L 65/1069* (2013.01);
(Continued)

(58) Field of Classification Search
CPC ... H04M 7/0078; H04M 3/4365; G10L 15/26; H04L 65/1069; H04L 65/1079
See application file for complete search history.

(56) References Cited

U.S. PATENT DOCUMENTS

| | | | |
|---|---|---|---|
| 9,584,658 | B2 | 2/2017 | Cohen et al. |
| 10,666,792 | B1 | 5/2020 | Marzuoli et al. |

(Continued)

OTHER PUBLICATIONS

Bursztein, et al., "Decaptcha: Breaking 75% of eBay Audio CAPTCHAs", 3rd USENIX Workshop on Offensive Technologies (WOOT), pp. 1-7, 2009.

(Continued)

*Primary Examiner* — Matthew E Heneghan
(74) *Attorney, Agent, or Firm* — Meunier Carlin & Curfman LLC

(57) ABSTRACT

An exemplary system and method are disclosed that is configured to evaluate by interrogation and analysis whether an incoming call from an unknown caller is a robo-call, e.g., a mass-market, spoofed, targeted, and/or evasive robocalls. The exemplary system is configured with a voice interaction model and analytical operation that can first pick up each incoming phone call on behalf of the recipient callee. The exemplary system then simulate natural conversation with the initiating caller by asking/interrogating the caller with a set of pre-stored questions that naturally occur in human conversations. The exemplary system employs the caller's responses to determine whether the call is a robocall or a natural person by assessing via pre-defined analysis for the context and/or expected natural human response.

19 Claims, 10 Drawing Sheets

(51) Int. Cl.
*H04L 65/1069* (2022.01)
*H04M 3/436* (2006.01)
*H04M 7/00* (2006.01)
*G10L 15/22* (2006.01)

(52) U.S. Cl.
CPC ....... *H04M 3/4365* (2013.01); *H04M 7/0078* (2013.01); *G10L 15/22* (2013.01); *H04M 2201/40* (2013.01); *H04M 2203/6072* (2013.01)

(56) References Cited

U.S. PATENT DOCUMENTS

| | | | | |
|---|---|---|---|---|
| 10,778,839 | B1 | 9/2020 | Newstadt et al. | |
| 2014/0196133 | A1* | 7/2014 | Shuster | G06F 21/31 726/7 |
| 2015/0195403 | A1* | 7/2015 | Goulet | H04M 3/436 379/142.05 |
| 2016/0330319 | A1 | 11/2016 | Farrand et al. | |
| 2018/0367526 | A1* | 12/2018 | Huang | H04L 63/0807 |
| 2019/0306322 | A1 | 10/2019 | Bostick et al. | |
| 2021/0289071 | A1* | 9/2021 | Way | G10L 15/22 |

OTHER PUBLICATIONS

Bursztein, et al., "The Failure of Noise-Based Non-Continuous Audio Captchas", Security and Privacy (S&P), 13 pages, 2011.
Chen, et al., "Semi-Supervised Models via Data Augmentation for Classifying Interactive Affective Responses", arxiv.org/pdf/2004.10972v1, pp. 1-10, Apr. 23, 2020.
Chiappetta, et al., "An Anomaly-Based Approach to the Analysis of the Social Behavior of VoIP Users", Computer Networks, vol. 57, No. 6, pp. 1545-1559, Apr. 22, 2013.
Cimpanu, Catalin, "FCC Tells US Telcos to Implement Caller ID Authentication by Jun. 30, 2021", Available online at URL—[https://www.zdnet.com/home-and-office/networking/fcc-tells-us-telcos-to-implement-caller-id-authentication-by-june-30-2021], 9 pages, Mar. 31, 2020.
Clark, et al., "What Makes a Good Conversation?: Challenges in Designing Truly Conversational Agents", Proceedings of the 2019 CHI Conference on Human Factors in Computing Systems, 12 pages, Jan. 19, 2019.
Yardi, et al., "Detecting Spam in a Twitter Network?", First Monday, vol. 15, No. 1, 12 pages, 2010.
Collins, Gail, "The Robocall Rebellion", Available online at URL—[https://www.nytimes.com/2021/07/28/opinion/the-robocall-rebellion.html], 3 pages, Jul. 28, 2021.
Conneau, et al., "Supervised Learning of Universal Sentence Representations from Natural Language Inference Data", Proceedings of the 2017 Conference on Empirical Methods in Natural Language Processing, pp. 670-680, Sep. 2017.
Cook, et al., "Catching Spam Before it Arrives: Domain Specific Dynamic Blacklists", Proceedings of the 2006 Australasian workshops on Grid computing and e-research, vol. 54, 10 pages, 2006.
Costin, et al., "The Role of Phone Nos. in Understanding Cyber-Crime Schemes", Eleventh Annual Conference on Privacy, Security and Trust, 9 pages, 2013.
Dantu, et al., "Detecting Spam in Voip Networks", SRUTI '05: Steps to Reducing Unwanted Traffic on the Internet Workshop, pp. 31-37, 2005.
Deerwester, et al., "Indexing by Latent Semantic Analysis", Journal of the American Society for Information Science, vol. 41, No. 6, pp. 391-407, Sep. 1990.
Devlin, et al., "BERT: Pre-training of Deep Bidirectional Transformers for Language Understanding", Proceedings of NAACL-HLT 2019, pp. 4171-4186, 2019.
Dietrich, et al., "Empirical Research on IP Blacklisting", ISSE 2008 Securing Electronic Business Processes, 8 pages, 2009.
Doupé, Adam, "Why We're Still Years Away from a Robocall-Free Future", Available online at URL—[https://www.cnn.com/2019/04/10/perspectives/stop-robocalls-shaken-stir/index.html#:~:text=Despite%20all%20the%20recent%20advances,they%20want%20without%20being%20caught.], 9 pages, Apr. 10, 2019.
Ester, et al., "A Density-Based Algorithm for Discovering Clusters in Large Spatial Databases with Noise", KDD'96: Proceedings of the Second International Conference on Knowledge Discovery and Data Mining, pp. 226-231, Aug. 2, 1996.
Fanelle, et al., "Blind and Human: Exploring More Usable Audio CAPTCHA Designs", Sixteenth Symposium on Usable Privacy and Security, pp. 111-125, 2020.
Felegyhazi, et al., "On the Potential of Proactive Domain Blacklisting", LEET'10: Proceedings of the 3rd USENIX conference on Large-scale exploits and emergent threats: botnets, spyware, worms, and more, 8 pages, Apr. 27, 2010.
Gambhir, et al., "Recent Automatic Text Summarization Techniques: A Survey", Artificial Intelligence Review, vol. 47, No. 1, pp. 1-66, Jan. 1, 2017.
Faulkner, Laura, "Beyond the Five-User Assumption: Benefits of Increased Sample Sizes in Usability Testing", Behavior Research Methods, Instruments, & Computers, vol. 35, No. 3, pp. 379-383, Aug. 2003.
Gopalakrishnan, et al., "Topical-Chat: Towards Knowledge-Grounded Open-Domain Conversations", Interspeech, pp. 1891-1895, Sep. 15, 2019.
Griffin, et al., "Vishing", Proceedings of the 5th Annual Conference on Information Security Curriculum Development, pp. 33-35, 2008.
Gupta, et al., "Phoneypot: Data-Driven Understanding of Telephony Threats",NDSS' 15, pp. 1-14, Feb. 8, 2015.
Hoath, Peter, "Telecoms Fraud, the Gory Details", Computer Fraud & Security, vol. 1998, No. 1, pp. 10-14, Jan. 1998.
Huang, et al., ""Is There Anything Else I Can Help You With?" Challenges in Deploying an On-Demand Crowd-Powered Conversational Agent", Proceedings of the AAAI Conference on Human Computation and Crowdsourcing, pp. 79-88, 2016.
Isacenkova, et al., "Inside the Scam Jungle: A Closer Look at 419 Scam Email Operations", EURASIP Journal on Information Security, vol. 2014, No. 1, pp. 4, pp. 1-18, 2014.
Jiang, et al., "Isolating and Analyzing Fraud Activities in a Large Cellular Network via Voice Call Graph Analysis", MobiSys '12: Proceedings of the 10th international conference on Mobile systems, applications, and services, pp. 253-266, Jun. 25, 2012.
Zhou, et al., "The Design and Implementation of Xiaolce, an Empathetic Social Chatbot", Computational Linguistics, vol. 46, No. 1, pp. 53-93, Mar. 2020.
Khatri, et al., "Alexa Prize—State of the Art in Conversational AI", AI Magazine, vol. 39 No. 3, pp. 40-55, Sep. 28, 2016.
Kimball, et al., "Interactive Voice Recognition Communication in Electoral Politics: Exploratory Metadata Analysis", American Behavioral Scientist, vol. 58, No. 9, pp. 1236-1245, Jan. 9, 2014.
Li, et al., "A Machine Learning Approach to Prevent Malicious Calls over Telephony Networks", IEEE Symposium on Security and Privacy (SP), pp. 53-69, 2018.
Li, et al., "Breaking E-Banking CAPTCHAs", ACSAC '10: Proceedings of the 26th Annual Computer Security Applications Conference, pp. 171-180, Dec. 6, 2010.
Liu, et al., "How NOT to Evaluate Your Dialogue System: An Empirical Study of Unsupervised Evaluation Metrics for Dialogue Response Generation", Proceedings of the 2016 Conference on Empirical Methods in Natural Language Processing, pp. 2122-2132, Nov. 2016.
Liu, et al., "Text Summarization with Pretrained Encoders", Proceedings of the 2019 Conference on Empirical Methods in Natural Language Processing and the 9th International Joint Conference on Natural Language Processing, pp. 3730-3740, Nov. 2019.
Maggi, Federico, "Are the Con Artists Back? a Preliminary Analysis of Modern Phone Frauds", 10th IEEE International Conference on Computer and Information Technology, 8 pages, 2010.
Marzuoli, et al., "Call Me: Gathering Threat Intelligence on Telephony Scams to Detect Fraud", Blackhat, 12 Pages, 2016.
Meutzner, et al., "Toward Improved Audio CAPTCHAs Based on Auditory Perception and Language Understanding", ACM Transactions on Privacy and Security (TOPS), vol. 19, No. 4, pp. 10-10.31, Nov. 19, 2016.

(56) References Cited

OTHER PUBLICATIONS

Mikolov, et al., "Efficient Estimation of Word Representations in Vector Space", Available online at URL—[https://arxiv.org/pdf/1301.3781], pp. 1-12, Sep. 7, 2013.
Mimno, et al., "Optimizing Semantic Coherence in Topic Models", Proceedings of the 2011 Conference on Empirical Methods in Natural Language Processing, pp. 262-272, Jul. 2011.
Miramirkhani, et al., "Dial One for Scam: A Large-Scale Analysis of Technical Support Scams", Network and Distributed System Security Symposium, pp. 1-15, Jul. 23, 2016.
Moya, et al., "Network Constraints and Multi-Objective Optimization for One-Class Classification", Neural Networks, vol. 9, No. 3, pp. 463-474, Apr. 1, 1996.
Mrkšić, et al., "Neural Belief Tracker: Data-Driven Dialogue State Tracking", Proceedings of the 55th Annual Meeting of the Association for Computational Linguistics, vol. 1, pp. 1777-1788, Jul. 2017.
Mustafa, et al., "You Can Call but You Can't Hide: Detecting Caller ID Spoofing Attacks", 44th Annual IEEE/IFIP International Conference on Dependable Systems and Networks, 12 pages, 2014.
Newman, Lily Hay, "The Robocall Crisis Will Never Be Totally Fixed", Available online at URL—[https://www.wired. com/story/robocalls-spam-fix-stir-shaken], 13 pages, 2019.
Ollmann, et al., "Understanding & Preventing Phishing Attacks", NISR The Phishing Guide, pp. 1-42, Sep. 2004.
Pandit, et al., "Towards Measuring the Effectiveness of Telephony Blacklists", Network and Distributed System Security Symposium, pp. 1-15, Feb. 2018.
Pennington, et al., "GloVe: Global Vectors for Word Representation", Proceedings of the 2014 Conference on Empirical Methods in Natural Language Processing (EMNLP), pp. 1532-1543, Oct. 2014.
Peters, et al., "Deep Contextualized Word Representations", Proceedings of the 2018 Conference of the North American Chapter of the Association for Computational Linguistics: Human Language Technologies, vol. 1 (Long Papers), pp. 2227-2237, Jun. 2018.
Povey, et al., "The Kaldi Speech Recognition Toolkit", IEEE 2011 Workshop on Automatic Speech Recognition and Understanding, 4 pages, 2011.
Prakash, et al., "PhishNet: Predictive Blacklisting to Detect Phishing Attacks", 2010 Proceedings IEEE INFOCOM, 5 pages, 2010.
Ramachandran, et al., "Can DNS-Based Blacklists Keep up with Bots?", The Third Conference on Email and Anti-Spam, pp. 1-2, 2006.
Ramachandran, et al., "Understanding the Network-Level Behavior of Spammers", Proceedings of the 2006 conference on Applications, technologies, architectures, and protocols for computer communications, pp. 291-302, 2006.
Ramos, Juan, "Using TF-IDF to Determine Word Relevance in Document Queries", Proceedings of the first instructional conference on machine learning, Citeseer, vol. 242, 4 pages, 2003.
Reaves, et al., "AuthentiCall: Efficient Identity and Content Authentication for Phone Calls", 26th USENIX Security Symposium, pp. 575-592, 2017.
Reaves, et al., "AuthLoop: End-to-End Cryptographic Authentication for Telephony over Voice Channels", 25th USENIX Security Symposium, pp. 963-978, 2016.
Sahin, et al., "SoK: Fraud in Telephony Networks", IEEE European Symposium on Security and Privacy, pp. 235-250, 2017.
Sahin, et al., "Using Chatbots Against Voice Spam: Analyzing Lenny's Effectiveness", Thirteenth Symposium on Usable Privacy and Security, pp. 319-337, 2017.
Sciuto, et al., ""Hey Alexa, What's Up?": A Mixed-Methods Studies of In-Home Conversational Agent Usage", Proceedings of the 2018 Designing Interactive Systems Conference, pp. 857-868, Jun. 8, 2018.
Serban, et al., "A Survey of Available Corpora for Building Data-Driven Dialogue Systems: The Journal Version", Dialogue & Discourse, vol. 9, No. 1, pp. 1-49, 2018.
Shah, et al., "Building a Conversational Agent Overnight with Dialogue Self-Play", Available online at URL—[https://arxiv.org/pdf/1801.04871], 11 pages, Jan. 2018.
Sherman, et al., "Are You Going to Answer That? Measuring User Responses to Anti-Robocall Application Indicators", Network and Distributed Systems Security (NDSS) Symposium 2020, pp. 1-17, 2020.
Solanki, et al., "In (Cyber)Space Bots Can Hear You Speak: Breaking Audio CAPTCHAs Using OTS Speech Recognition", Proceedings of the 10th ACM Workshop on Artificial Intelligence and Security, pp. 69-80, Nov. 3, 2017.
Soupionis, et al., "Audio CAPTCHA: Existing Solutions Assessment and a New Implementation for VoIP Telephony", Computers and Security, vol. 29, No. 5, pp. 603-618, Jul. 1, 2010.
Srinivasan, et al., "Exposing Search and Advertisement Abuse Tactics and Infrastructure of Technical Support Scammers", WWW'18: Proceedings of the 2018 World Wide Web Conference, pp. 319-328, Apr. 23, 2018.
Srinivasan, et al., "Understanding Cross-Channel Abuse with SMS-Spam Support Infrastructure Attribution", 21st European Symposium on Research in Computer Security (ESORICS), pp. 1-20, Sep. 28, 2016.
Suendermann, et al., "From Rule-Based To Statistical Grammars: Continuous Improvement of Large-Scale Spoken Dialog Systems", IEEE International Conference on Acoustics, Speech and Signal Processing, pp. 4713-4716, 2009.
Syed, et al., "SNARE: Spatio-Temporal Network-Level Automatic Reputation Engine", CSE Technical Reports ; GT-CSE-08-02, pp. 1-14, 2008.
Tam, et al., "Breaking Audio CAPTCHAs", Advances in Neural Information Processing Systems 21 (NIPS 2008), pp. 1-8, 2008.
Tax, "One-Class Classification Concept-Learning in the Absence of Counter-Examples", National Technical Reports Library, pp. 1-208, 2001.
Tseng, et al., "FrauDetector: A Graph-Mining-Based Framework for Fraudulent Phone Call Detection", KDD '15: Proceedings of the 21th ACM SIGKDD International Conference on Knowledge Discovery and Data Mining, pp. 2157-2166, Aug. 10, 2015.
Tu, et al., "SoK: Everyone Hates Robocalls: A Survey of Techniques Against Telephone Spam", IEEE Symposium on Security and Privacy, pp. 320-338, 2016.
Tu, et al., "Toward Authenticated Caller ID Transmission: The Need for a Standardized Authentication Scheme in Q.731.3 Calling Line Identification Presentation", ITU Kaleidoscope 2016—ICTs for a Sustainable World, pp. 1-8, Nov. 2016.
Tu, et al., "Users Really Do Answer Telephone Scams", 28th USENIX Security Symposium, pp. 1327-1340, 2019.
Wald, A., "Sequential Tests of Statistical Hypotheses", The Annals of Mathematical Statistics, vol. 16, No. 2, pp. 117-186, Jun. 1945.
Weizenbaum, Joseph, "Eliza—A Computer Program for the Study of Natural Language Communication Between Man and Machine", Communications of the ACM, vol. 9, No. 1, pp. 36-45, Jan. 1, 1966.
Yan, et al., "DocChat: An Information Retrieval Approach for Chatbot Engines Using Unstructured Documents", Proceedings of the 54th Annual Meeting of the Association for Computational Linguistics (vol. 1, Long Papers), pp. 516-525, Aug. 2016.
International Search Report and Written Opinion received in PCT/US2022/046278 mailed Feb. 17, 2023.
"4.82 Billion Robocalls Mark 1.7% Rise in February, Says YouMail Robocall Index", Available online at URL—[https://www.prnewswire.com/news-releases/4-82-billion-robocalls-mark-1-7-rise-in-february-says-youmail-robocall-index-301017189.html], 4 pages, Mar. 5, 2020.
"AT&T Security Apps", Available online at URL—[https://www.att.com/security/security-apps/], 8 pages, Retrieved on Feb. 3, 2025.
"BBB Scam Alert: "Neighbor Spoofing" Is a Common Type of Phone Scam", Available online at URL—[https://www.bbb.org/article/news-releases/16670-a-new-kind-of-phone-scam-neighbor-spoofing], 3 pages, May 29, 2020.
"Cmu PocketSphinx", Available online at URL—[https://cmusphinx.github.io/], 2 pages, Retrieved on Feb. 3, 2025.

(56) References Cited

OTHER PUBLICATIONS

"Combating Spoofed Robocalls with Caller ID Authentication", Available online at URL—[https://www.fcc.gov/call-authentication], 4 pages, Retrieved on Jan. 20, 2025.
"Complying with the Telemarketing Sales Rule", Available online at URL—[https://www.ftc.gov/business-guidance/resources/complying-telemarketing-sales-rule], 77 pages, Retrieved on Jan. 27, 2025.
"DeepSpeech", Available online at URL—[https://github.com/mozilla/DeepSpeech], 4 pages, Retrieved on Jan. 22, 2025.
"Experts Estimate 2015 Fraud Losses at $38.1 Billion (USD)", Available online at URL—[https://www.pipelinepub.com/news/global-telecom-fraud-losses-down-significantly], 2 pages, Retrieved on Jan. 23, 2025.
"Federal Trade Commission", Available online at URL—[https://www.ftc.gov/], 4 pages, Retrieved on Jan. 27, 2025.
"Firebase", Available online at URL—[https://firebase.google.com/], 12 pages, Retrieved on Feb. 3, 2025.
"FCC Seeks Reliable Call Authentication System", Available online at URL—[https://www.fcc.gov/document/fcc-seeks-reliable-call-authentication-system-0], 2 pages, Retrieved on Feb. 3, 2025.
"Google Duplex: An AI System for Accomplishing Real-World Tasks Over the Phone", Available online at URL—[https://research.google/blog/google-duplex-an-ai-system-for-accomplishing-real-world-tasks-over-the-phone/], 9 pages, May 8, 2018.
"Google Pixel", Available online at URL—[https://support.google.com/pixelphone/?hl=en#topic=7078250], 3 pages, Retrieved on Feb. 10, 2025.
"Google Speech-to-Text", Available online at URL—[https://cloud.google.com/speech-to-text], 9 pages, Retrieved on Jan. 21, 2025.
"Hiya", Available online at URL—[https://www.hiya.com/], 8 pages, Retrieved on Jan. 20, 2025.
"Honk", Available online at URL—[https://github.com/castorini/honk], 5 pages, Retrieved on Feb. 5, 2025.
"How Does a Robocall Work Infographic", Available online at URL—[https://consumer.ftc.gov/articles/0381-how-does-robocall-work-infographic], 4 pages, Oct. 2012.
"National Do Not Call Registry", Available online at URL—[https://www.donotcall.gov/], 1 page, Retrieved on Feb. 3, 2025.
"Neighbor Scam Grows Dramatically in 2018; Scammers Evolve Spoofing Tactics", Available online at URL—[https://blog.hiya.com/neighbor-scam-moves-on-to-spoofing-just-area-codes/], 9 pages, Retrieved on Jan. 20, 2025.
"Nomorobo", Available online at URL—[https://www.nomorobo.com/], 3 pages, Retrieved on Jan. 20, 2025.
"Phone by Google", Available online at URL—[https://play.google.com/store/apps/details?id=com.google.android.dialer&hl=en_IN], 5 pages, Retrieved on Jan. 27, 2025.
"Phone Industry Robocall Strike Force Announces Plans for Tackling Unwanted Calls", Available online at URL—[https://advocacy.consumerreports.org/press_release/phone-industry-robocall-strike-force-announces-plans-for-tackling-unwanted-calls/], 5 pages, Aug. 19, 2016.
"Pindrop", Available online at URL—[https://www.pindrop.com/], 9 pages, Retrieved on Feb. 3, 2025.
"Secure Telephone Identity Revisited", Available online at URL—[https://datatracker.ietf.org/wg/stir/about/], 4 pages, Retrieved on Jan. 21, 2025.
"Singular Value Decomposition", Available online at URL—[https://en.wikipedia.org/wikiSingular_value_decomposition], 17 pages, Retrieved on Feb. 3, 2025.
"Snowboy", Available online at URL—[https://web.archive.org/web/20200910215355/https://snowboy.kitt.ai/], 4 pages, Retrieved on Feb. 11, 2025.
"Spacy", Available online at URL—[https://spacy.io/], 9 pages, Retrieved on Jan. 22, 2025.
"Spoofcard", Available online at URL—[https://www.spoofcard.com/], 7 pages, Retrieved on Feb. 3, 2025.
Available online at URL—"Tech Support Scams", Available online at URL—[https://www.ftc.gov/business-guidance/small-businesses/cybersecurity/tech-support-scams], 4 pages, Retrieved on Jan. 27, 2025.
"Telephone Consumer Protection Act 47 U.S.C. § 227", Available online at URL—[https://www.fcc.gov/sites/default/files/tcpa-rules.pdf], 3 pages.
"Those Annoying Robocalls aren't Going to Stop Today. But They Could Slow down Soon", Available online at URL—[https://edition.cnn.com/2021/07/02/tech/robocall-prevention-stir-shaken/index.html], 9 pages, Retrieved on Jan. 22, 2025, Author = Duffy.
"Truecaller", Available online at URL—[https://www.truecaller.com/], 9 pages, Retrieved on Jan. 20, 2025.
"Truth in Caller ID Act of 2009", Available online at URL - [https://www.congress.gov/111/plaws/publ331/PLAW-111publ331.pdf], 5 pages, 2010.
"Twilio", Available online at URL—[https://www.twilio.com/en-us], 12 pages, Retrieved on Feb. 3, 2025.
"Understanding STIR/SHAKEN", Available online at URL - [https://transnexus.com/whitepapers/understanding-stir-shaken/], 9 pages, Retrieved on Jan. 21, 2025.
"Verizon", Available online at URL—[https://www.verizon.com/], 9 pages, Retrieved on Jan. 20, 2025.
"Verizon Stop Unwanted Calls", Available online at URL—[https://www.verizon.com/support/residential/homephone/calling-features/stop-unwanted-calls], 3 pages, Retrieved on Feb. 3, 2025.
"Webrtcvad", Available online at URL—[https://github.com/wiseman/py-webrtcvad], 3 pages, Retrieved on Feb. 3, 2025.
"Whitepages", Available online at URL—[https://www.whitepages.com/], 5 pages, Retrieved on Feb. 3, 2025.
"YellowPage", Available online at URL—[https://www.yellowpages.com/], 3 pages, Retrieved on Feb. 3, 2025.
"Youmail", Available online at URL—[https://www.youmail.com/], 9 pages, Retrieved on Jan. 20, 2025.
Allahyari, et al., "Text Summarization Techniques: A Brief Survey", International Journal of Advanced Computer Science and Applications, vol. 8, No. 10, pp. 397-405, 2017.
Antonakakis, et al., "Building a Dynamic Reputation System for DNS", 19th USENIX Security Symposium, 17 pages, 2010.
Askin, Dan, "The Free Cruise Offer: Scam or Legit?", Available online at URL—[https://www.tcava.com/articles/view/?ID=118], 8 pages, Retrieved on Feb. 4, 2025.
Bai, et al., "Detection and Filtering Spam over Internet Telephony—a User-Behavior-Aware Intermediate-Network-Based Approach", 2009 IEEE International Conference on Multimedia and Expo, pp. 726-729, 2009.
Balasubramaniyan, et al., "CallRank: Combating SPIT Using Call Duration, Social Networks and Global Reputation", CEAS 2007—Fourth Conference on Email and Anti-Spam, 8 pages, 2007.
Balasubramaniyan, et al., "PinDr0p: Using Single-Ended Audio Features to Determine Call Provenance", Proceedings of the 17th ACM conference on Computer and communications security, 12 pages, 2010.
Bidgoli, et al., ""Hello. This Is the IRS calling.": A Case Study on Scams, Extortion, Impersonation, and Phone Spoofing", APWG Symposium on Electronic Crime Research (eCrime), 13 pages, Apr. 25, 2017.
Bobrow, et al., "GUS, a Frame-Driven Dialog System", Artificial Intelligence, vol. 8, No. 2, pp. 155-173, Apr. 1, 1977.
Bojanowski, et al., "Enriching Word Vectors with Subword Information", Transactions of the Association for Computational Linguistics, vol. 5, pp. 135-146, Jun. 2017.

* cited by examiner

SMARTVA: HELLO, YOU'VE REACHED THE VIRTUAL ASSISTANT.
SMARTVA: HOW CAN I HELP YOU?
CALLER: I AM LOOKING FOR TAYLOR SMITH. WE MET AT A SEMINAR TODAY.
SMARTVA: BEFORE I FORWARD YOUR CALL, PLEASE ANSWER A FEW QUESTIONS.
SMARTVA: HOW ARE YOU DOING TODAY?
CALLER: I'M FINE.
SMARTVA: I'M SORRY, I DIDN'T GET THAT. CAN YOU SAY THAT AGAIN?
CALLER: I SAID I'M FINE.
SMARTVA: BEFORE I FORWARD YOUR CALL, PLEASE SAY YOUR NAME.
CALLER: THIS IS DANIEL.
SMARTVA: THANK YOU. PLEASE WAIT WHILE I FORWARD YOUR CALL.

FIG. 4A

ROBOCALL BLOCKING METHOD AND SYSTEM

RELATED APPLICATION

This application is a U.S. National Stage application filed under 35 U.S.C. § 371 of PCT/US2022/046278, filed Oct. 11, 2022, which claims priority to, and the benefit of, U.S. Provisional Patent Application No. 63/254,377, filed Oct. 11, 2021, entitled "Robocall Blocking Method and System", each of which is incorporated by reference herein in their entirety.

GOVERNMENT SUPPORT CLAUSE

This invention was made with government support under Grant No. 1514035 awarded by the National Science Foundation. The government has certain rights in the invention.

BACKGROUND

Mass robocalls affect millions of people on a daily basis. A robocall is a phone call that employs computerized or electronic autodialers to deliver a pre-recorded message as if from a robot. The call can be for political and telemarketing purposes or can be or public service and/or emergency announcements. Telemarketing calls are generally undesired and can be benign (e.g., in soliciting a business service or product) or even malicious (e.g., theft phishing and the like). Organizations such as schools, medical service providers, and businesses may employ computerized or electronic autodialers to provide notifications, e.g., of emergencies, statuses, and appointments. There is interest in being able to discern calls that will provide information of interest and reject calls that are undesired.

To address undesired robocall issues, cellphone manufactures, and telephony or VOIP service providers may provide phone blocklists and caller identification services. More sophisticated robocall telemarketers have employed identification spoofing technology as well as different calling numbers to avoid such detection.

There is a benefit to improving the screening of undesired telephone calls.

SUMMARY

An exemplary system and method are disclosed that is configured to evaluate by interrogation and analysis whether an incoming call from an unknown caller is a robocall, e.g., a mass-market, spoofed, targeted, and/or evasive robocall. The exemplary system is configured with a voice interaction model and analytical operation that can first pick up each incoming phone call on behalf of the recipient callee. The exemplary system then simulates natural conversation with the initiating caller by asking/interrogating the caller with a set of pre-stored questions that naturally occur in human conversations. The exemplary system employs the caller's responses to determine whether the call is a robocall or a natural person by assessing via pre-defined analysis for the context and/or expected natural human response. The pre-stored questions are designed to be easy and natural for humans to respond to but difficult for an automated robo-caller or telemarketer with a pre-defined script. In some embodiments, the analysis is performed on natural language processing (NLP)-based machine learning operations to evaluate the context or appropriateness of the caller's response.

In some embodiments, the exemplary system is characterized as a smart virtual assistant (SmartVA) system (referred to herein as "RobocallGuardPlus").

Based on the evaluation, the exemplary system can (i) forward a call to the recipient callee it has determined that the caller is a person or based on a user-defined preference or (ii) reject the call, or forward it to voicemail, it has determined to be a robocaller or a non-desired call based on the user-defined preference. A study was conducted that evaluated an example implementation of the exemplary system and concluded that the example implementation (e.g., of a Smart Virtual Assistant system) fulfilled the intended benefit while preserving the user experience of an incoming phone call. The study also performed security analyses and demonstrated that the Smart Virtual Assistant system could stop existing and fairly sophisticated robocaller.

In as aspect, a system is disclosed comprising a processor; and a memory having instructions stored thereon, wherein execution of the instructions by the processor causes the processor to: initiate, a telephony or VOIP session with a caller telephony or VOIP device; generate a first audio output over the telephony or VOIP session associated with a first caller detector analysis; following the generating of the first audio output and in response to a first audio input being received, generate a first transcription or natural language processing data of the first audio input (e.g., using a speech recognition operation or natural language processing operation); determine via the first caller detector analysis whether the first audio input is an appropriate response for a first context evaluated by the first caller detector analysis; generate a second audio output over the telephony or VOIP session associated with a second caller detector analysis; following the generating of the second audio output and in response to a second audio input being received, generate a second transcription or natural language processing data of the first audio input (e.g., using a speech recognition operation or natural language processing operation); determine via the second caller detector analysis whether the second audio input is an appropriate response for a second context evaluated by the second caller detector analysis; determine a score for the telephony or VOIP device; and initiate a second telephony or VOIP session with a user's telephony or VOIP device based on the determination, or direct the telephony or VOIP session with the caller telephony or VOIP device to end call or to a voicemail.

In some embodiments, the instructions further cause the processor to generate a notification of the telephony or VOIP session with the caller telephony or VOIP device.

In some embodiments, the instructions further cause the processor to generate a third audio output over the telephony or VOIP session associated with a third caller detector analysis; following the generating of the third audio output and in response to a third audio input being received, generate a third transcription or natural language processing data of the third audio input (e.g., using a speech recognition operation or natural language processing operation); and determine, via the third caller detector analysis, whether the third audio input is an appropriate response for a third context evaluated by the third caller detector analysis.

In some embodiments, any one of the first, second, or third caller detector analyses (or the first or second caller detector analysis) includes a context analysis employing a semantic clustering-based classifier.

In some embodiments, any one of the first, second, or third caller detector analyses (or the first or second caller detector analysis) includes a relevance analysis employing a semantic binary classifier trained using a (question, response) pair.

In some embodiments, any one of the first, second, or third caller detector analyses (or the first or second caller detector analysis) includes an elaboration analysis employing a keyword spotting algorithm.

In some embodiments, any one of the first, second, or third caller detector analyses (or the first or second caller detector analysis) includes an elaboration detector employing a current word count of a current response compared to a determined word count of a prior response as one of the first, second, or third transcription or natural language processing data.

In some embodiments, anyone of the first, second, or third caller detector analyses (or the first or second caller detector analysis) include an amplitude detector employing an average amplitude evaluation of any one of the first, second, or third audio inputs.

In some embodiments, any one of the first, second, or third caller detector analyses (or the first or second caller detector analysis) includes a repetition detector employing one or more features selected from the group consisting of a cosine similarity determining, a word overlap determination, and named entity overlap determination.

In some embodiments, any one of the first, second, or third caller detector analyses (or the first or second caller detector analysis) includes an intent detector employing a comparison of the first, second, or third transcription or natural language processing data to a pre-defined list of pre-defined affirmative response or a pre-defined list of negative responses.

In some embodiments, the system is configured as a cloud infrastructure.

In some embodiments, the system is configured as a smart phone.

In some embodiments, the system is configured as an infrastructure of a cell phone service provider.

In some embodiments, any one of the first, second, and third audio output are selected from a library of stored audio outputs, wherein each of the stored audio outputs has a corresponding caller detector analysis.

In some embodiments, the first audio output, the second audio output, and the third audio output are randomly selected.

In some embodiments, the first transcription or natural language processing data is generated via a speech recognition or natural language processing operation.

In some embodiments, the semantic binary classifier or the semantic clustering-based classifier employs a neural network model.

In another aspect, a computer-executed method is disclosed comprising picking up a call and greeting a caller of the call; waiting for a first response and then asking a first randomly selected question from a list of available questions; waiting for a second response and then asking a second randomly selected question from a list of available questions; determine based on at least the first response and/or second response whether the call is a person or a robot caller; and asking a third question based on the determination.

In another aspect, a method is disclosed comprising steps to operate the systems of any one of the above-discussed claims.

In another aspect, a computer-readable medium is disclosed, having instructions stored thereon, wherein execution of the instructions operates any one of the above-discussed systems.

BRIEF DESCRIPTION OF THE DRAWINGS

The skilled person in the art will understand that the drawings described below are for illustration purposes only.

FIG. 4A shows an example sequence of interrogation provided by the non-person caller detector of FIG. 1A, 1B, or 1C in accordance with an illustrative embodiment.

DETAILED SPECIFICATION

Figure 1A:
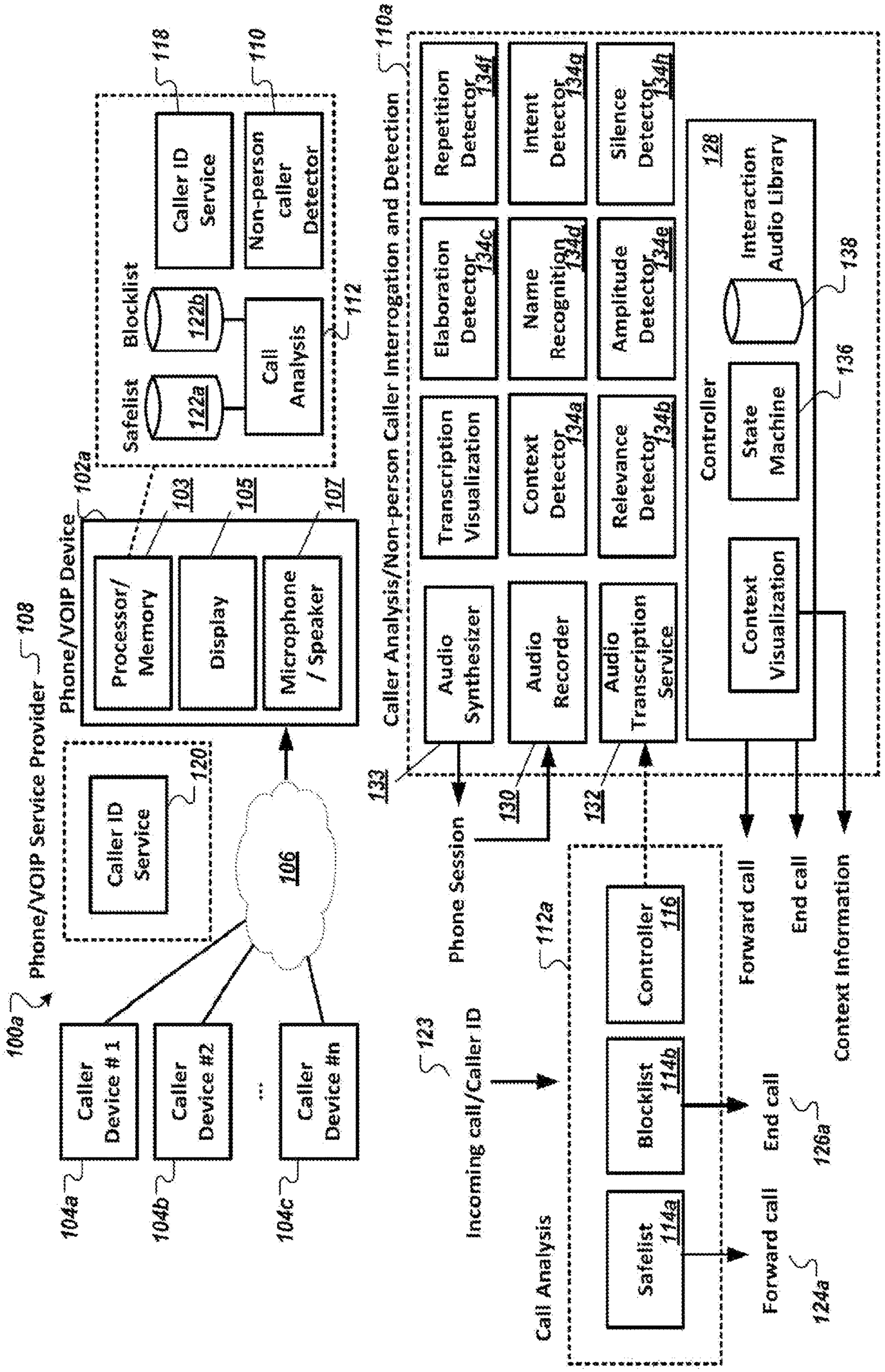
FIGS. 1A, 1B, and 1C each shows an example system 100 (shown as 100$a$, 100$b$, and 100$c$, respectively) configured to interrogate and analyze an unidentified caller of an incoming telephony or VOIP session is an undesired robo-caller in accordance with an illustrative embodiment.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entirety and to the same extent as if each reference was individually incorporated by reference.

The exemplary system and method (also referred to herein as "RobocallGuardPlus") is configured to receive incoming calls on behalf of a user without user interruption and intervention. If the incoming call is from a safelisted caller, it can pick up the call and can immediately notify the user by ringing the phone. The operation may be tailored by the user per user's preferences. A safelist is define-able by the user and can include the user's contact list and other allowed caller IDs (such as a global safelist which consists of public schools, hospitals etc.). On the other hand, if the call is from a blocklisted caller, the exemplary system and method can block the call, e.g., without even letting the phone ring and/or forward the call to the voicemail. And, if the caller, per the caller identification, belongs to neither the safelist nor the blocklist, the exemplary system and method can pick up the call without ringing the phone (and disturbing the recipient callee) and initiate a conversation with the recipient caller (also referred to herein as the "user") to decide whether this call should be brought to the attention of the recipient caller.

The exemplary system and method can use a combination of analysis operations of responses of the caller to estimate whether the caller is a robocaller or natural person as well as their purpose, in some embodiments. In some embodiments, upon picking up the call, it can greet the caller and let the caller know that he/she is talking to a virtual assistant. During the conversation, the exemplary system and method can then execute a list of pre-defined questions or randomly choose a question from a predefined pool of questions to present to the caller. The questions are those that are preferably naturally occurring in human conversations. The exemplary system and method can then determine if the response provided by the caller is appropriate for the question asked.

It is difficult for a robocaller without natural language comprehending capabilities to provide an appropriate response but easy and natural for a human to answer these questions.

In some embodiments, the exemplary system can dynamically vary the number of questions asked to the caller before making this decision depending on the responses provided by the caller and the confidence score for the labeling generated from the analysis. For example, if the exemplary system and method are highly confident that the caller is a human or a robocaller after asking two questions, it can skip asking additional questions and notifying the callee/user of the call. The exemplary system and method can ask additional questions if it is not able to make a decision at any current given time. The number of questions may be predefined, e.g., the number may be set as a balance between usability and security, for example, five.

Based on the above-operation, the exemplary system and method can label a caller as a human or robocaller. If the caller is deemed to be a human, the call is passed to the callee along with the transcript of the purpose of the call. On the other hand, if the caller is determined to be a robocaller, the exemplary system and method can block the call and notifies the user of the blocked call through a notification. The exemplary system and method can also store the transcript of the call for the user's convenience. Because the exemplary system and method do not solely depend on the availability of a blacklist of known robocallers, it can be effective even in the presence of caller ID spoofing.

Example System #1

Figure 1B:
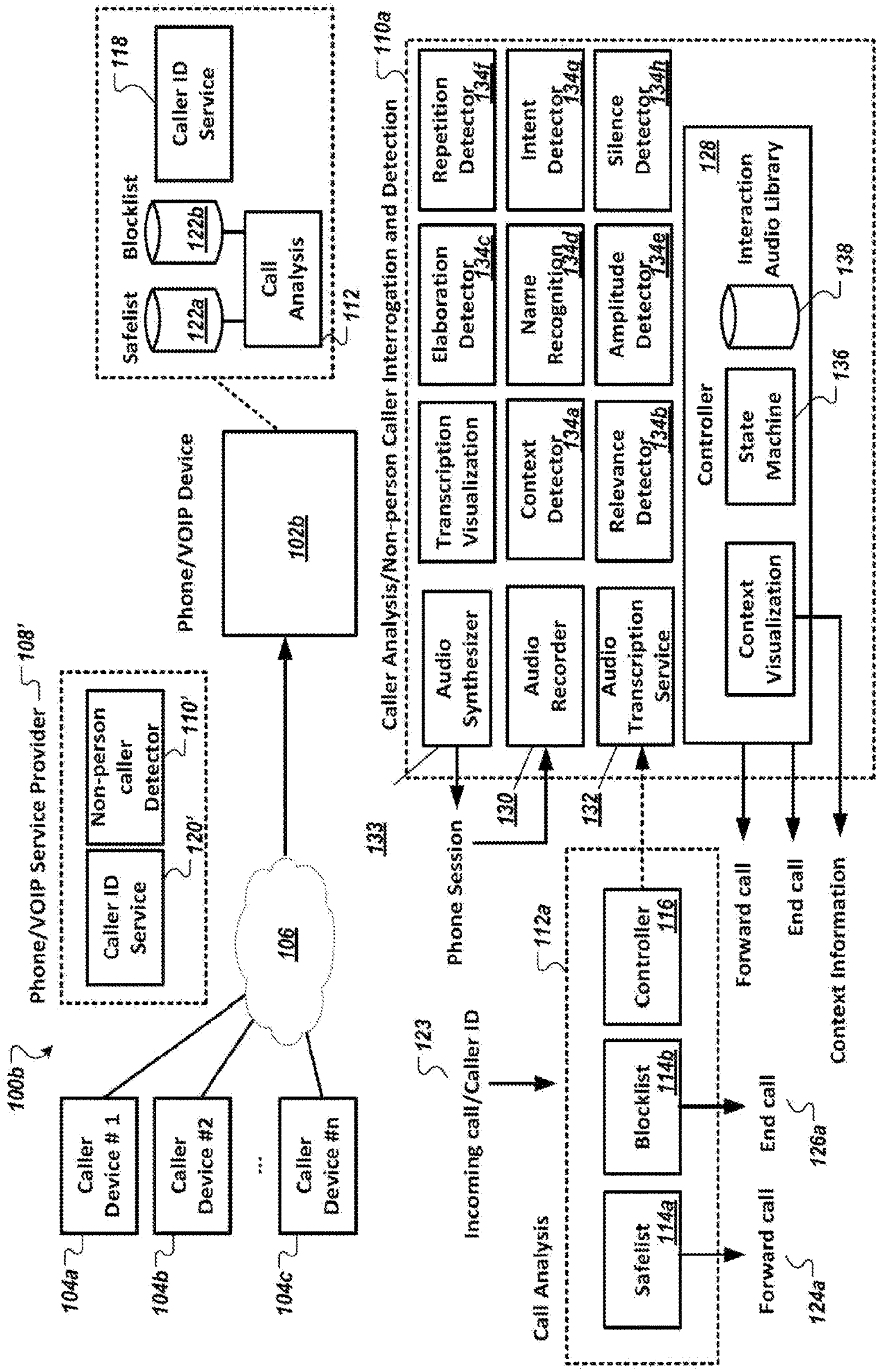
Figure 1C:
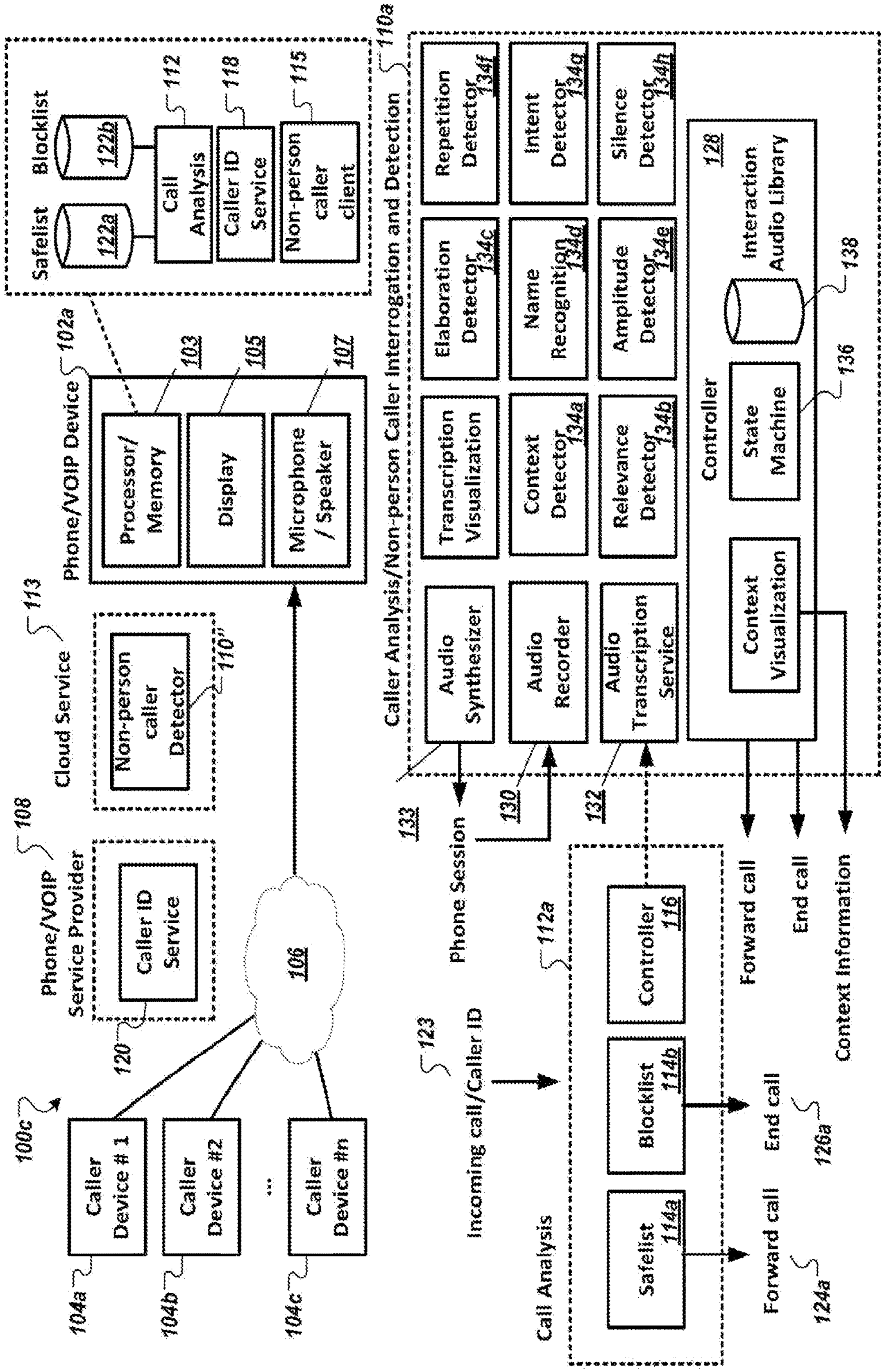

FIGS. 1A, 1B, and 1C each shows an example system 100 (shown as 100*a*, 100*b*, and 100*c*, respectively) configured to interrogate and analyze an unidentified caller of an incoming telephony or VOIP session is an undesired robo-caller in accordance with an illustrative embodiment.

In the example shown in FIGS. 1A, 1B, and 1C, the system (e.g., 100*a*, 100*b*, 100*c*) includes a phone or VOIP device 102 (shown as 102*a*) configured to receive a call from a caller device 104 (shown as "Caller Device #1" 104*a*, "Caller Device #2" 104*b*, and "Caller Device #n" 104*c*) over a network 106 that is managed and operated, e.g., a phone/VOIP service provider 108.

FIG. 1A shows the example system 100*a* having a non-person caller detector 110 implemented on a user's device. In the example shown in FIG. 1A, the phone or VOIP device 102*a* includes a processor and memory (shown collectively as 103) with instructions stored thereon to execute a non-person caller detector 110 (shown as "Caller Analysis/Non-person Caller Interrogation and Detection" 110*a*, as one example) configured to perform (i) the interrogation of the unidentified caller with pre-stored natural language questions and (ii) analysis of the response from the unidentified caller. The device 102*a* includes a display 105 and a microphone/speaker 107.

FIG. 1B shows the example system 100*b* having the non-person caller detector 110 (shown as 110') executing on the service provider's infrastructure 108.

FIG. 1C shows the example system 100*c* having the non-person caller detector 110 (shown as 110") implemented in a cloud infrastructure 113 (shown as "Cloud Service" 113) that operates with a client 115 (shown as "Non-person caller client" 115) executing on the user's device 102*a*.

Referring to FIG. 1A, also shown in the example of FIGS. 1B and 1C, the phone or VOIP device (e.g., 102*a*, 102*b*) is configured with a caller identification service module 118 that is configured to receive call identification information from the phone/VOIP service provider 108, e.g., that is executing a caller identification service 120.

Phone/VOIP service provider 108 can be a fixed line operator (e.g., public switched telephone network (PSTN) operator), mobile-device network operator, broadband communication operators, specific-application communication operator (e.g., VOIP service provider), and network 106 can be the appropriate communication channels for that service provider. The phone or VOIP device 102 may be a PSTN telephone that operates with an external device (see FIG. 1B), a smart phone, a computer, a tablet, or another consumer communication device.

In the example in FIGS. 1A, 1B, 1C, the phone or VOIP device 102*a* further includes a call analysis module 112 (shown in further detail in 112*a*), e.g., configured with a safelist and blocklist operation modules 114 (shown as "Safelist" module 114*a* and "Blocklist" module 114*b*, respectively) and a controller 116. The safelist module 114*a* and blocklist 114*b* may operate with the device memory or database 122*a*, 122*b* having stored safe-caller identifiers and blocklist identifiers, respectively. The safelist module 114*a* and blocklist 114*b* may forward a call (124*a*) to the recipient callee (user) if the received caller identifier 123 is located on a safe list and block a call (126*a*) if the received caller identifier 123 is located on the blocked list. In some embodiments, the actions of the call analysis module 112*a* based on the outputs of the safelist and blocklist operation modules 114*a*, 114*b* may be user-definable, e.g., forward the caller to user or device-associated voicemail rather than blocking a call.

In the example shown in FIGS. 1A and 1C, the controller 116 is configured to initiate the operation of the non-person caller detector 110*a* if the caller identifier is unknown. In some embodiments, known caller identifier from the safelist may still be interrogated via the non-person caller detector 110*a*, e.g., for context or based on the user-definable setting. The controller 116 may maintain labels for families and friends (trusted), trusted lines for companies, non-trusted lines for companies, and blocked identifiers. In the example of FIG. 1B, the caller ID service 120' of the service provider 108' can initiate the operation of the non-person caller detector 110' (shown in 110*a*) if the caller identifier is unknown.

The non-person caller detector (e.g., 110, 110' and 110"), e.g., shown implemented as 110*a*, is configured to perform (i) the interrogation of the unidentified caller with pre-stored natural language questions and (ii) analysis of the response from the unidentified caller. In the example shown in FIGS. 1A, 1B, and 1C, the person caller detector 110*a* includes a controller 128, an audio recorder module 130, an audio transcription service module 132, an audio synthesizer module 133, an audio transcription service module 133, and a set of one or more analysis modules 134 (shown as a context detector module 134*a*, a relevance detector module 134*b*, an elaboration detector module 134*c*, a name recognition module 134*d*, an amplitude detector module 134*e*, a repetition detector module 134*f*, an intent detector module 134*g*, and a silence detector module 134*h*).

The controller 128, in the example of FIGS. 1A, 1B, and 1C, includes a state machine 136 and a caller interaction library 138. The state machine 136 directs the operation of the controller 128 to perform the interrogation and analysis of the caller, e.g., in combination with the other modules (e.g., 130, 132, and 134*a*-134*h*). The caller interaction library 138 is configured to a store set of pre-stored questions having an associated analysis, e.g., for interrogation of a context response, a relevance response, an elaboration response, a name recognition response, a voice loudness/amplitude response, a repetition response, an intent response, and/or a silence response. In various embodiments, the system (e.g., 100) may include a subset of the questions and/or analysis modules. Other analyses may be additional employed in combination with those described herein.

Recorder. Audio recorder module 130 is configured to record an audio snippet or audio file in the telephony or VOIP session. The recordation operation can be directed by the controller 128. Because the telephony or VOIP session only includes a single caller on a caller device (e.g., 104) as the phone/VOIP device (e.g., 102) is being handled by the non-person caller detector 110, the audio recorder module 130 would only record the voice or audio message of only the caller. The audio recorder module 130 is configured, in some embodiments, to record an audio while the acoustic power of the audio is above a certain threshold or until a maximum record time is reached, e.g., 20 seconds. The audio recorder module 130 then provides the recorded audio file or audio snippet/data to the audio transcription service module 132.

Transcriber. Audio transcription service module 132 is configured to receive the recorded audio file or audio snippet/data and generate, via a natural language processing (NPL) operation or other speech recognition operation, a textual data of the recording. Examples of NPL operators include TensorFlow and PyTorch, AllenNLP, HuggingFace, Spark NLP, SpaCy NLP, among others.

This component is configured to transcribe the responses provided by the caller. The transcriptions of the responses are then used by the other modules to determine if the responses are appropriate or not. Moreover, the transcript or summary of the conversation between the caller and non-person caller detector (e.g., 110) can be outputted, e.g., via display 105, to the user to provide additional context for an incoming call. The recipient callee/user can use the information to assess the content of the call without picking up and having to engage with the caller.

For calls that are not passed to the user and/or hung up/rejected by the non-person caller detector (e.g., 110), the non-person caller application can store the call context that can be later reviewed, e.g., by the user. The non-person caller detector (e.g., 110) does not need to engage in a conversation with callers that are safelisted and can pass the calls directly to the user. Therefore, transcripts may not be provided for such calls. All other callers can be greeted by a non-person caller detector (e.g., 110), and hence a transcript can be generated and made available to the user to understand the content of the calls.

In some embodiments, the non-person caller detector (e.g., 110) can interrogate safelisted callers based on a user-defined preference. In some embodiments, the system can notify the user of an incoming call from a safelisted number and present the user with an option to select the non-person caller application to interrogate the caller for information to present to the user in the non-person caller application.

Any number of transcription or speech recognition operations may be employed. There are many software libraries and APIs available for transcription, e.g., the Google Cloud Speech API [51], Kaldi [52], and Mozilla deep speech [53]. The audio transcription service module 132 can send the audio recording of the caller's response to an external service (e.g., Google Cloud) and a corresponding transcript is returned.

Interrogation Module. Audio synthesizer module 133 is configured to generate, e.g., using a media player or audio generator, an audio output in the telephony or VOIP session of an interaction file selected from the caller interaction library 138. The audio output may be outputted to a driver circuit or electronic circuit to drive the speaker (e.g., 107). The controller 128 may select or indicate an interaction file in the caller interaction library 138 to be processed and may direct the audio synthesizer module 133 to retrieve the interaction file to generate the audio output in the telephony or VOIP session. The audio output may be generated from static pre-stored voice/audio files. In some embodiments, the audio output is stored as text which can be employed by a voice synthesizer to dynamically generate the audio output.

The analysis modules (e.g., 134*a*-134*h*) are configured, in some embodiments, to operate with the controller 128 and audio transcription service module 132 to analyze the textual or NPL data from a recorded response of the caller. The controller 128 can direct the audio synthesizer module 133 to play an interaction file in the telephony or VOIP session; the indication or selection command for the selected interaction file can also be employed to select or invoke the appropriate analysis modules (e.g., 134*a*-134*h*). FIGS. 5A and 5B, later described herein, provide an example operation of the state machine 136.

Table 1 provides a summary of example analysis modules (e.g., 134*a*-134*h*) that may be employed by the non-person caller detector (e.g., 110).

TABLE 1

| Analysis Module | Interrogation Type | Description | |
|---|---|---|---|
| Context Detector | Context | Analysis of the caller's verbal response to "How can I help you?" | Semantic clustering-based classifier |
| Relevance Detector | Relevance | Binary classifier analysis of pre-defined question pair. | Semantic Binary classifier |
| Elaboration Detector | Elaboration | Analysis of the caller's verbal response to "Tell me more about it" as a follow-up to the context question. | Non-Semantic utterance counter |
| Name Recognition | Intended recipient | Analysis of the caller's verbal response to "Who would like you to speak to?" | Keyword spotting algorithm |
| Amplitude Detector | Request action-Change Volume | Analysis of the caller's verbal response to "Please speak more loudly." | Measure change in average amplitude |
| Repetition Detector | Request action-Repeat | Analysis of the caller's verbal response to "Please say that again." | Semantic Repetition Classifier |
| Intent Detector | Affirming intended recipient | Analysis of the caller's verbal response to "Please say that again" as a follow-up to the name question. | Affirmative word Classifier |
| Silence Detector | Request action-Pause | Request the caller to pause the conversion. | Word count analysis |

Example Operation

FIG. 2 is a diagram showing an example operation 200 of the non-person caller detector of FIG. 1A, 1B, or 1C in accordance with an illustrative embodiment.

As discussed above, the non-person caller detector (e.g., 110, 110', and 110") can intercept all incoming calls, so the phone or VOIP session does not immediately ring and notify the callee of an incoming call. The non-person caller detector (e.g., 110), in some embodiments, can perform a preliminary decision via a preliminary amendment 202, e.g., based on the caller ID of the incoming call. There can be, e.g., three scenarios: (i) the caller ID belongs to a predefined safelist (ii) the caller ID belongs to a predefined blocklist, or (iii) the caller ID does not belong to these predefined lists and thus is labeled as an unknown caller. In some embodiments, the preliminary amendment 202 may include a user-definable action (e.g., alert user of incoming safelist call and select action). If the caller ID is safelisted, the exemplary system and method can immediately pass the call to the callee. The non-person caller detector (e.g., 110) can (i) block calls from blocklisted caller IDs or forward the call to voicemail and (ii) does not ring the phone. The non-person caller detector (e.g., 110) can perform additional interrogative analysis 204 (shown as "Interrogative Assessment" 204) for the calls from unknown callers to understand the nature of the calls. In some embodiments, the non-person caller detector (e.g., 110) can be invoked by the user, e.g., a user selecting for the non-person caller detector to pick up the incoming call from on a safelisted number.

Figure 2A:
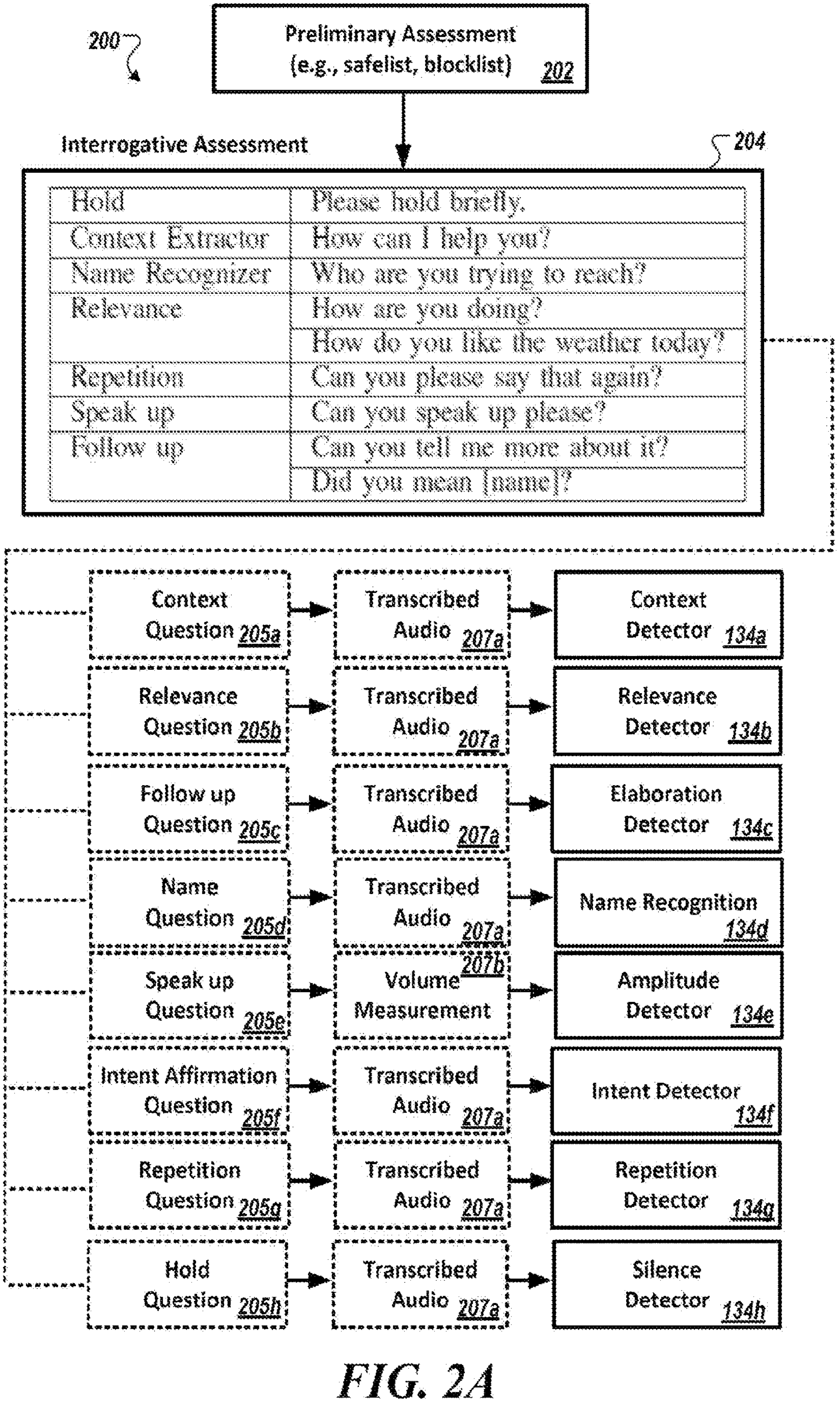
FIGS. 2A and 2B are each a diagram showing an example operation of a non-person caller detector of FIG. 1A, 1B, or 1C in accordance with an illustrative embodiment.
Figure 2B:
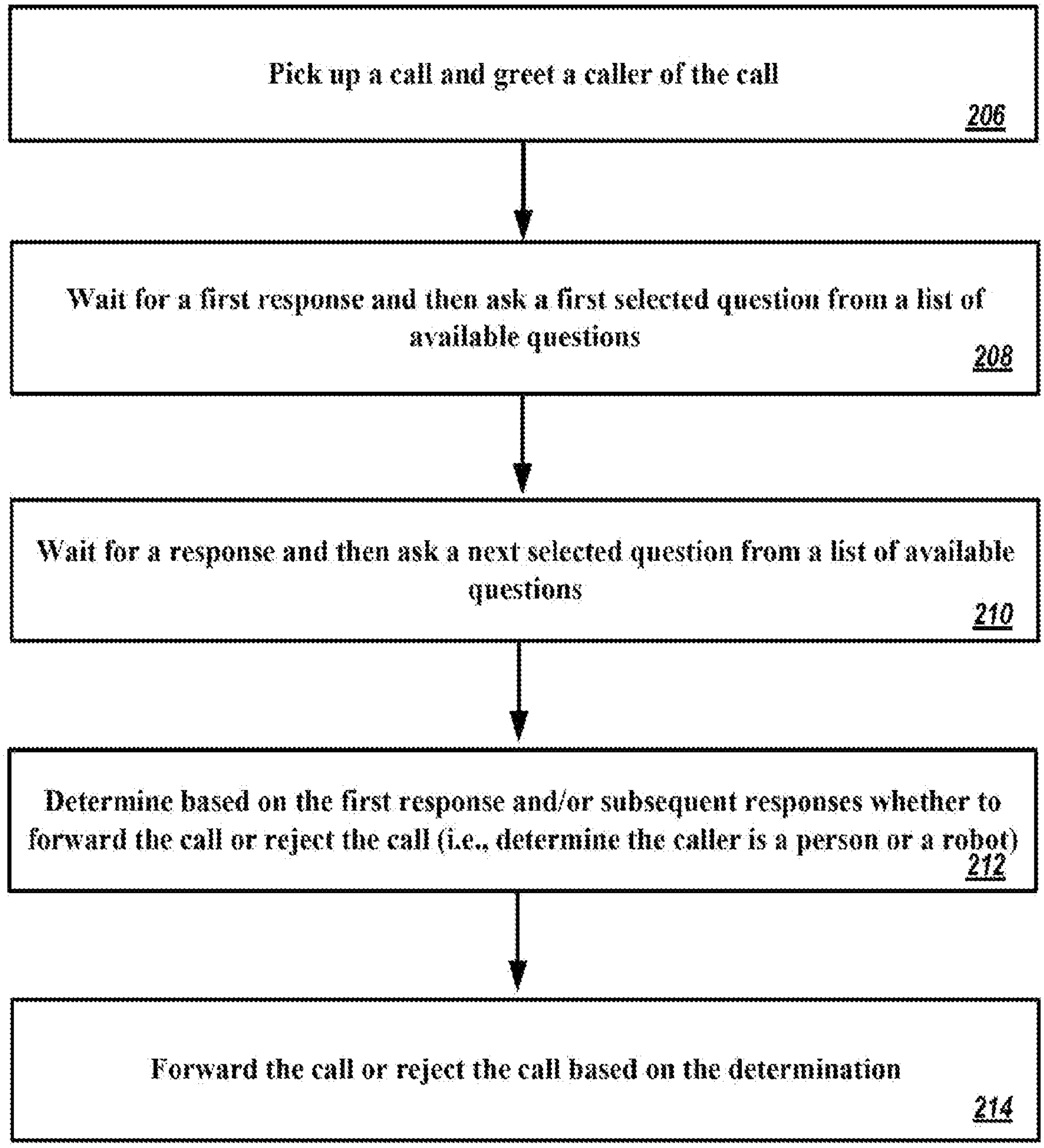

To perform the interrogative assessment, and as shown in FIG. 2B, the non-person caller detector can first greet (206) the caller and let the caller know that he/she is talking, e.g., to a virtual assistant. The non-person caller detector (e.g., 110) can then select a question from a list of available questions. In some embodiments, the non-person caller detector (e.g., 110) can select the question randomly or according to a pre-defined rule set. In other embodiments, the questions may be defined in a static list. In yet other embodiments, multiple questions may be provided for a question type, and the sequence of question types to be presented to the caller can be statically defined. Once the caller has responded to the previous question, the non-person caller detector (e.g., 110) can then ask (210) another question from the question pool. The questions, as disclosed herein, are designed to be easy and natural for humans to answer, but without comprehending what the question is, it is difficult for robo-callers to answer. Other questions may be employed. The non-person caller detector (e.g., 110) can then determine (210) if the response from the caller is appropriate or reasonable for the question asked and, e.g., assign a label (appropriate, not appropriate). The non-person caller detector (e.g., 110) may also assign a confidence score with each label.

The non-person caller detector (e.g., 110) may then can ask (210) another question or make a decision. Based on the provided score or label, the non-person caller detector (e.g., 110) can make an estimation or detection of whether the caller is a human or robo-caller. The number of questions the non-person caller detector (e.g., 110) may ask the caller before making this decision can be static or it can be dynamically established depending on the responses provided by the caller. In some embodiments, the number of questions or the decision to ask additional question may employ a determined confidence score of the classifier label generated by the non-person caller detector (e.g., 110). For example, if the non-person caller detector (e.g., 110) determines a high confidence value indicating, based on the caller's response, that the caller is a human or a robocaller after asking two questions, it can skip asking a third question and direct the caller to the user according to its pre-defined workflow operation.

The non-person caller detector (e.g., 110) can be configured to ask the next question if it is not able to make a decision at any current given time. The minimum and the maximum number of questions asked by the non-person caller detector (e.g., 110) can be set by the user. In some embodiments, the user of minimum and maximum numbers of questions can have a default of two and five, respectively, which is typical for most phone calls. The default can be varied, e.g., by a system administrator for the non-person caller detector (e.g., 110).

In FIG. 2A, the selected questions (205*a*-205*h*) may be transcribed (207*a*) or measured (207*b*) to be analyzed by a corresponding analysis (e.g., 134*a*-134*h*), e.g., per Table 1.

In some embodiments, the non-person caller detector (e.g., 110) can be configured to at least ask for the caller to provide a context or purpose of the call before completing the conversation with the caller if it has not already been asked. This question ensures that the non-person caller detector (e.g., 110) can provide a context notification/output to the recipient callee/user about the nature of the incoming call.

Referring back to FIG. 2B, based on the assessment (e.g., 212), if the caller is deemed to be a human, the non-person caller detector (e.g., 110) can forward (214) the call to the user. In some embodiments, the non-person caller detector (e.g., 110) can additionally provide the context information and/or other information (e.g., caller ID information) about the incoming call. The non-person caller detector (e.g., 110) can block (214) calls from robo-callers or direct them to a voicemail service. The non-person caller detector (e.g., 110) can provide notifications and information about the blocked call to the user.

Experimental Result and Additional Examples

A study was conducted that developed an example non-person caller detector (also referred to as a smart virtual assistant or "SmartVA"). FIGS. 3A-3H show example implementations of the analysis framework and state machine of the non-person caller detector. FIG. 4A shows an example sequence of interrogation between the smart virtual assistant and an example caller in the test. FIG. 4B shows an example infrastructure of the non-person caller detector implemented in the study.

The study implemented several transcription services, including Kaldi, Mozilla Deep Speech, and Google Cloud Speech API, and selected the Google Cloud Speech API for the evaluation system.

FIG. 4B shows an example implementation of the exemplary Robocall blocking system used in the study. With each incoming call, the study used a Metadata Detector module to determine if the caller ID is present in the safelist or blocklist. Calls from safelisted callers are forwarded to the callee, calls from blocklisted callers are blocked, and calls from unknown callers are passed to the Controller of the Robocall Detector.

Example Interrogation Questions. During the conversation with the caller, the system used in the study picked questions to ask. These questions are asked to determine if the caller can provide relevant answers to natural questions occurring in a typical phone conversation between two humans. The responses to these questions were used to determine if the caller is a robocaller or a human. The study designed questions that are easy and natural for a human caller to respond to during a phone call. However, the responses to these questions are specific enough that they do not typically appear in robocall messages. The study considered the balance between usability and security. Table 2 shows example criteria for the questions.

TABLE 2

| | |
|---|---|
| Number of questions | To strike a good balance between usability and security, the number of questions should be set appropriately. Asking too many questions may annoy the caller and degrade the call experience. Asking too few questions can make it easy for undesired callers to evade the system. |
| Type of questions | Caller experience greatly depends on the type of questions that are asked. To preserve usability, the system can limit questions that are reasonably common at the beginning of a phone conversation between people who may not know each other. However, at the same time there should be sufficient variations in the questions so that the system is robust against attackers. |
| Gathering call context | Besides preserving usability, determining the context of the call is useful. Context extracting questions should be asked so that meaningful information (such as the purpose of the call, the caller's name etc.) is available to the callee prior to engaging with the caller. |
| Hold | Observed to be common in phone conversations, the system may ask the caller to hold briefly. |
| Context Extractor | The system can ask for context information such as purpose of the call. Prerecorded robocalls will contain robocall messages (free cruise, vehicle warranty etc.); on the other hand human callers will provide legitimate context. |
| Name Recognizer Question | This question can be asked to determine whether the caller can provide the correct name of the callee. If the caller knows the callee, they would be capable of saying who they are trying to reach. |
| Relevance Question | This type of questions are commonly occurring questions in a natural human conversation and can be employed to allow the system to determine if the caller can comprehend the questions and provide an appropriate response. |
| Repetition Question | This question asks the caller to repeat what they just said. It is reasonable to expect from a human to repeat a statement by either repeating the exact same statement or saying a semantically similar statement. |
| Speak up | It is very natural in a human conversation to ask a caller to speak up. The system can ask this question to determine if the caller can indeed speak up when asked to do so. |
| Follow up | The system may choose to ask a follow up question after asking certain questions. For example, RobocallGuardPlus might ask "Can you please tell me more about it?" as a follow up question after asking "How can I help you?" Moreover after asking, "Who are you trying to reach?", the ssystem might ask "Did you mean [name]?" as a follow up question. The [name] here can be two things, the correct name of the callee or an arbitrary name. For example if the name of the callee is Taylor, RobocallGuardPlus can ask "Did you mean Taylor?" or ask "Did you mean Tiffany?", where Tiffany is not the name of the callee. |

The study evaluated the use of different variations of each question. For example, the question "How are you?" can have multiple variations with the same meaning, such as "How are you doing?", "How's it going?" etc. This enables the study to ruggedize the system to defend against robocallers that can use the audio length of a question to determine what question was asked. With multiple variations of the same question, a robocaller would need to comprehend what the system is saying in order to provide an appropriate response.

Example Order of Equation. The study employed rules for the system. First, after the announcement and initial greeting by the system, the system would randomly choose to ask the caller to hold or not. The study then can randomly choose to ask the context detector or name recognizer type question with equal probability. Subsequently, the system was configured to continue the conversation or block/forward the call based on the previous responses. If the system decided to continue the conversation at this point, it randomly chooses one of the "Follow up," "Relevance," "Repetition," "Name Recognizer," "Hold" questions with high probability or "Speak up" with low probability.

If the system decides to ask a fourth or fifth question, it randomly chooses one context question, repetition question, name recognizer question, hold request, relevance question, and speak up request. The system could ask a specific question only once during the interaction with the caller. The rules were designed to keep the conversation similar to a typical phone call in addition to increasing the entropy for the attacker so that there is no specific pattern that the attacker can exploit. FIG. 4A shows an example interaction between a caller and an example system.

Threat Models. The study addressed both targeted robocalls and evasive robocalls. Targeted robocalls are when the robo-callers know the name and phone number association of a particular recipient. An evasive robocaller is defined to circumvent screening, e.g., using voice activity.

Example Controller State Machine

Figure 3A:
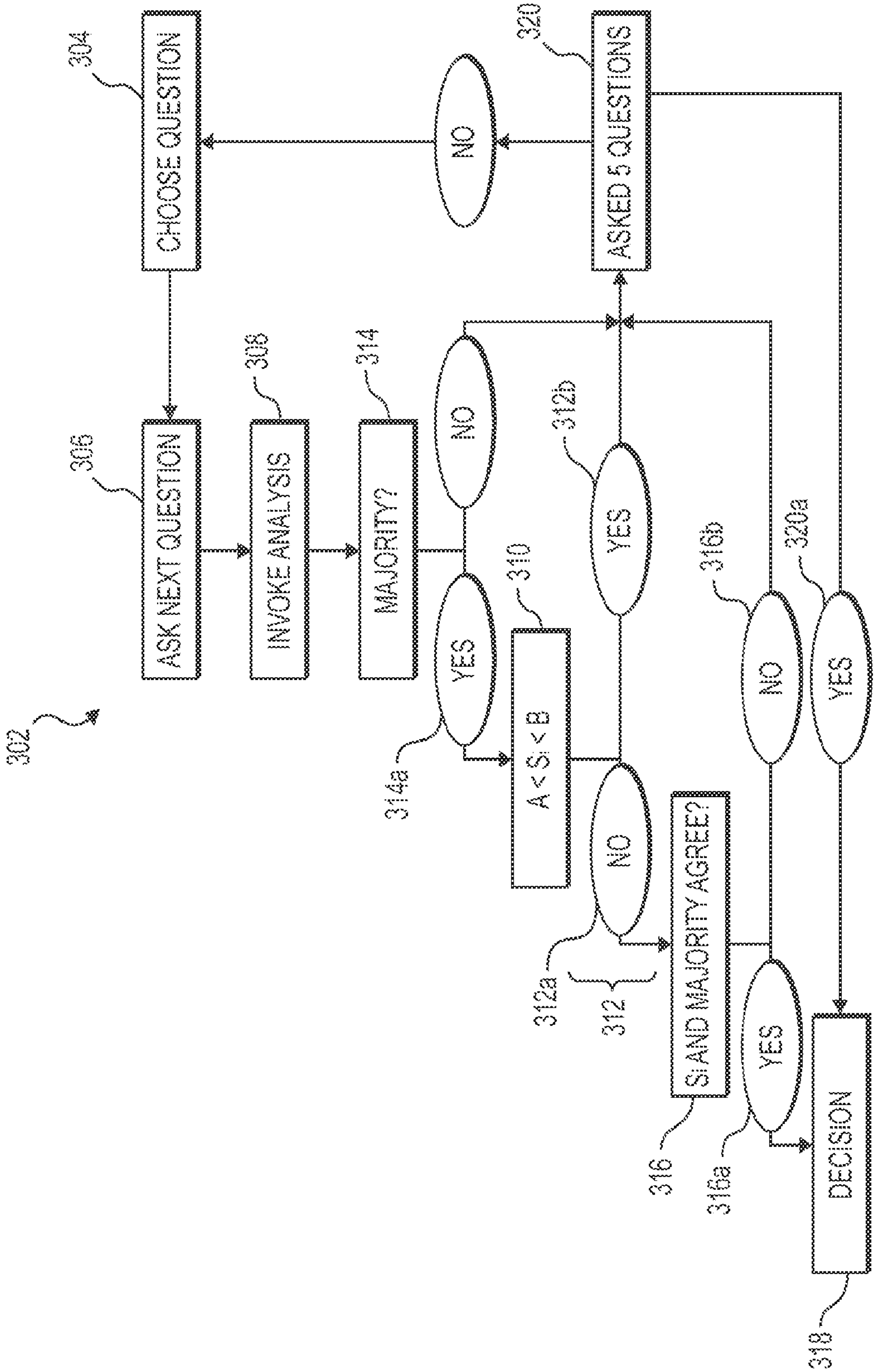
FIG. 3A shows an example operation of a state machine of a controller of the non-person caller detector of FIG. 1A, 1B, or 1C in accordance with an illustrative embodiment.

Referring to FIG. 3, FIG. 3A shows an example state machine (e.g., 128) of the controller (e.g., 136) of the non-person caller detector (e.g., 110), e.g., of FIGS. 1A, 1B, and/or 1C, that was implemented in a study in accordance with an illustrative embodiment. The controller (e.g., 136) was configured via the state machine (e.g., 128, and shown as 302) to access the question set and select a question to ask the caller at every turn.

In the example of FIG. 3A, after asking each question (by selecting (304) and generating (306) an audio output of the question), the controller could record the response from the caller. The audio from the caller was recorded until the caller finished speaking or until a maximum of defined time is reached (e.g., 20 seconds). The audio recording was then transcribed, e.g., through the audio transcription service module (e.g., 132), and/or measured.

The controller (e.g., 136) then invoked (308) one or more analyses via individual modules (e.g., 134*a*-134*h*, etc.) to analyze the transcribed audio (as a file or snippet or other measurements as described herein) and label the transcription of the caller's responses to determine if it is an appropriate response. For example, the relevance detector module (e.g., 134*b*) can be invoked to determine if the caller's response is an appropriate verbal response semantically to a relevance question being interrogated to the caller; the repetition detector module (e.g., 134*f*) may be invoked to determine if the response is an appropriate one in response to a repetition question being interrogated to the caller, among others, as shown in FIG. 2A.

Each of the analysis modules (e.g., relevance detector module 134*b*, repetition detector module 134*f*, or other described herein) analyzed the input audio (or measurement) to determine a label (e.g., label=appropriate/not appropriate) for a given classifier and a corresponding confidence score. After every analysis, the non-person caller detector (e.g., 110) assessed (310) the likelihood that the response is from a caller that is a person or a machine via a hypothesis testing operation. For the assessment (310), the state machine 302 may direct the calculation of a sequential probability ratio test (SPRT) score, $S_i$ (where $1 \le i \le 5$), according to the Equations 1 and 2.

$$S_i = S_{i-1} + \min\left(\frac{1}{\lambda}, 1\right) \times \log A_i \quad \text{(Eq. 1)}$$

$$\log A_i = \log\left(\frac{C_i}{1 - C_i}\right) \quad \text{(Eq. 2)}$$

In Eq. 2, $C_i$ is the confidence value generated by a given analysis module (e.g., 134*a*-134*h*), and $\lambda$ is a tunable parameter that determines the weight of the $i^{th}$ prediction. In an implementation, the $\lambda$ can be set, e.g., to 3. Additional examples of the sequential probability ratio test may be found in [50].

To perform the hypothesis testing operation (e.g., using classical hypothesis testing as an example), the state machine 302 established hypothesis testing for a pair of hypotheses H0 and H1 based on the SPRT value in which H0 and H1 are defined as:

H0: Caller is human

H1: Caller is robocaller

The study used the output of the hypothesis testing operation output as a stopping rule. The stopping rule 312 to stop (312*a*) or to continue with additional interrogation (312*b*) was established using a threshold operation per Equation set 3.

$$a < S_i < b\text{: continue interrogation}$$

$$S_i \ge b\text{: accept } H_1$$

$$S_i \le a\text{: accept } H_0 \quad \text{(Eq. Set 3)}$$

In Equation Set #3, the values of a and b can depend on the desired type I and type II errors, α and β per Equation Set #4 in which α and β are chosen, e.g., to be 5%.

$$a \approx \log\frac{\beta}{1-\alpha} \quad \text{(Eq. Set 4)}$$

$$b \approx \log\frac{\beta}{1-\alpha}$$

In the study, λ was set to 3, and α and β were set to 5%.

The state machine 302 defined at least two predictions and, at most, five evaluations/interrogations to make a decision on whether a caller is a robocaller or not. The state machine 302 determined the number of questions to ask the caller before making a decision. At any given point, if a majority does not exist in the prediction labels, the state machine 302 directs the system to ask the next question. The state machine 302 also evaluated (314) the majority label using a majority voting ensemble. The majority voting ensemble is a meta-classifier that can combine a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

If a majority exists (314*a*) and the $S_i$ score is between values a and b (per 312*b*), the state machine 302 directed the continuation of the caller assessment to ask the next question (304). Otherwise, the state machine 302 checked (316) if the majority labels and the label supported by SPRT (according to the stopping rule specified above) are in agreement. If yes (316*a*), the state machine 302 finalized the label and made (318) a decision to forward the call if the caller is labeled human and block the call if the caller is labeled robocaller. If not (316*b*), the state machine 302 directed the continuation of the caller assessment to ask the next question. The state machine 302 may also make (320*a*) a decision after a pre-defined number of interrogative assessments was made (320).

Example Context Detector Training

Context Detector. The study developed an example of the context detector module (e.g., 134*a*) that can be invoked after the non-person caller detector says, e.g., "How can I help you?" to the caller. The context detector module (e.g., 134*a*) was configured to label the audio response of the caller as an inappropriate response or an appropriate response using a classifier, e.g., a semantic clustering-based classifier.

Figure 3B:
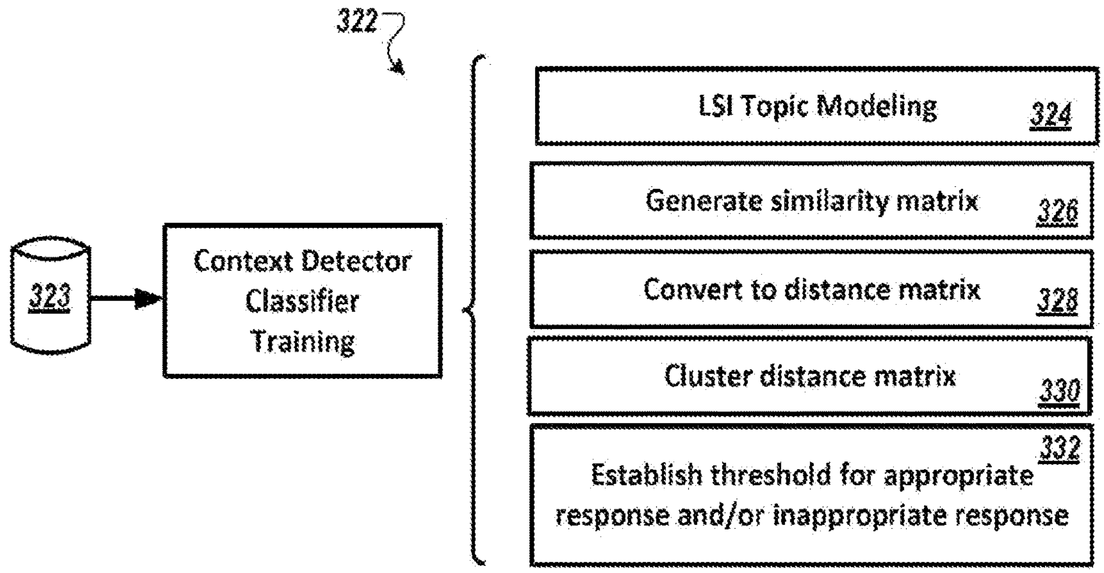
FIG. 3B shows an example operation of a context detector of an example non-person caller detector of FIG. 1A, 1B, or 1C in accordance with an illustrative embodiment.
Figure 4B:
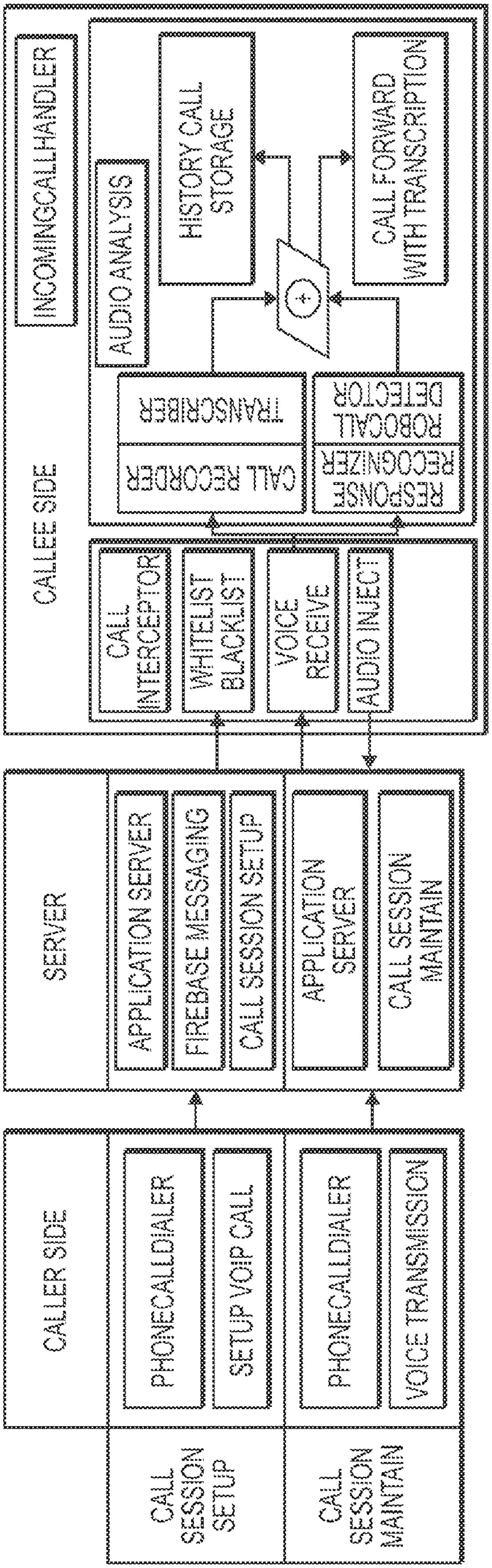
FIG. 4B shows an example infrastructure of the non-person caller detector implemented in a study in accordance with an illustrative embodiment.

FIG. 3B shows an example method 322 to build the classifier. The study employed a dataset 323 of phone call records collected at a large phone honeypot, e.g., of a commercial robocall blocking company. The dataset 323 contained 8081 calls (having an average duration of 32.3 seconds) acquired at the telephony honeypot between Apr. 23, 2018 and May 6, 2018. The dataset 323 included records of the source phone number, the time of the call, an audio recording of the call, and a transcript of the audio recording.

To filter out misdialed calls, the study extracted important topics (e.g., per [3]) from the transcripts of calls employing the LSI topic modeling (324). Thirty (30) topics were extracted from the corpus of transcripts in which each topic represented a spam campaign. The study constructed a similarity matrix (326) by computing the cosine similarity between each transcript. The study then converted (328) the similarity matrix into a distance matrix by inverting the elements of the similarity matrix. The study then performed DBSCAN clustering (330) on the distance matrix. DBSCAN is a clustering algorithm that can group, for given a set of points, points that are closely packed together and mark, as outliers, points that lie alone in low-density regions. Seventy-two (72) clusters were created in which each cluster represented groups of highly similar transcripts of robocalls. It was observed that the clustering operation filtered non-spam calls as outliers.

To establish the threshold for the appropriate and/or inappropriate response (332), the study then took one representative robocall from each cluster and calculated the vector representations by projecting the robocall messages onto the pre-computed LSI topic model. To classify a response from a user, the context detector module (e.g., 134*a*) used in the study, after preprocessing the text, calculated the vector representation by projecting the response onto the pre-computed LSI topic model. It then computed the cosine similarity of the user response with pre-computed 79 robocall messages. If the cosine similarity was greater than a threshold, C's, the context detector module labeled the response as an inappropriate response and vice-versa. That is, if the content of the caller's response matches with any previously known robocall message, it is labeled as a "not appropriate" response; otherwise, it is labeled as an "appropriate" response. In one implementation, the threshold was determined to be 0.85 after offline data analysis of known robocall messages.

Example Relevance Detector Training

Relevance Detector. The study developed an example of the relevance detector module (e.g., 134*b*) that can determine whether the response from the caller is an appropriate response for a relevance question. The study employed a binary classifier for the relevance detector module (e.g., 134*b*). The classifier, for a given (question, response) pair, could label the response as appropriate if the response is a reasonable answer to the question selected by the controller and not appropriate if not. Human callers were expected to provide appropriate responses and robocallers were expected to provide not appropriate responses.

Figure 3C:
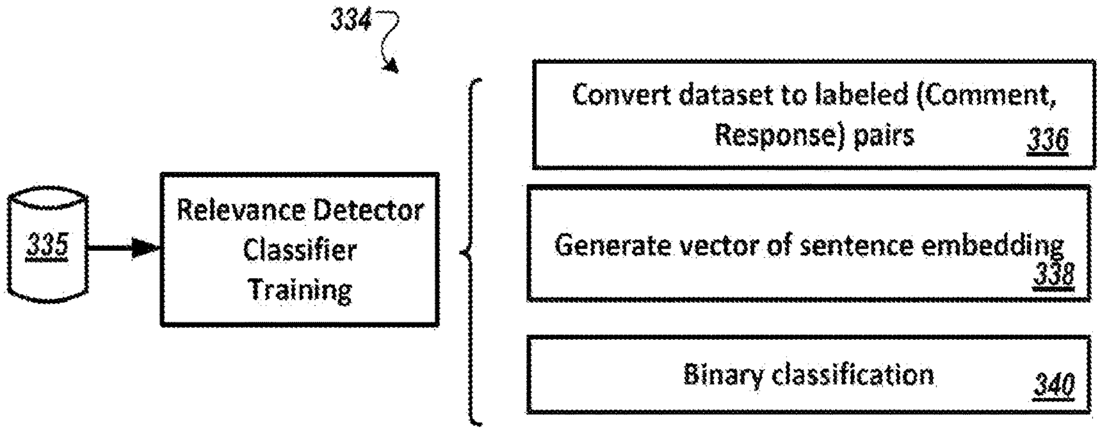
FIG. 3C shows an example operation of a relevance detector of an example non-person caller detector of FIG. 1A, 1B, or 1C in accordance with an illustrative embodiment.

FIG. 3C shows an example method 334 to build the relevance detector classifier. The study used the "Fisher English Training Part 2, Transcripts" dataset 335. *Fisher English Training Part* 2 *Transcripts* represent the second half of a collection of conversational telephone speech (CTS) that was created at the LDC (2003). The dataset 335 included time-aligned transcripts for the speech contained in *Fisher English Training Part* 2, *Speech*. Under the Fisher protocol, a large number of participants each makes a few calls of short duration speaking to other participants, whom they typically do not know, about an assigned topic. To encourage a broad range of vocabulary, the Fisher participants were asked to speak about an assigned topic which is selected at random from a list, which changes every 24 hours and which is assigned to all subjects paired on that day.

The study further tailored the dataset 335 to build a Relevance Detector model by taking the conversation between each speaker pair (e.g., speaker A and B) and converting (336) them into (comment, response) pairs. The study labeled each of these (comment, response) pairs as "appropriate." To generate the irrelevant examples, for each comment by speaker A, the study randomly picked a response that was not the response provided by speaker B from the Fisher dataset and labeled that pair as "not-appropriate." In all, the study generated 300,000 "appropriate" (comment, response) pairs and 300,000 "not-appropriate" (comment, response) pairs as a training dataset. The study then performed sentence embedding (338) on each data point to convert the text into a vector. Similar to word embeddings (like Word2Vec [57], GloVE [58], Elmo or Fasttext [60]), sentence embeddings embed a full sentence into a vector space. The study used Infersent to perform sentence embedding on our data points. InferSent is a sentence embedding method that provides semantic sentence representations. It was trained on natural language inference data and generalized well to many different tasks. The study then converted the data points (comment, response) pairs to (comment embedding, response embedding) pairs (where comment embedding denotes the sentence embedding of the comment and response embedding denotes the sentence embedding of the response). The (comment embedding, and response embedding) pairs were then passed to the binary classification model (340).

Base Model: The study used a Multilayer Perceptron (MLP) as a base model. The study empirically set the architecture of the model as (1024, 512, 256, 1). The study used 384,000 data points to train the base model. The training, validation, and test accuracy of the base model were observed to be 83%, 70%, and 70% respectively. To test with robocalls, the study treated the questions asked by the non-person caller detector (e.g., 110) as a "comment" (in the noted pairing) and the transcripts from robocall recordings as a "response" in the pairing.

Finetuning Base Model: The study then finetuned the base model to specifically recognize robocalls and legitimate (human) calls. The study assumed that human callers would be able to provide appropriate responses to the questions whereas the robo-callers would not. Therefore the study labeled (question, robocall response) pairs as "not appropriate" and (question, human response) pairs as "appropriate" to finetune the base model.

The study employed a neural network model. The parameters for the finetuned model is shown in Table 3.

TABLE 3

| | |
|---|---|
| Number of layers | 4 |
| Number of units in the layers | 1st layer: 512<br>2nd layer: 256<br>3rd layer: 64<br>4th layer: 1 |
| Optimizer | Stochastic gradient descent (fine tuning operation) |
| Learning rate | 0.01 |

Data Collection and Processing: To generate the "not appropriate" responses, the study used the dataset of robocalls. The study took the first 30 words (as the system let each response to be of at most 20 seconds) from each robocall transcript and paired it with both relevance questions to form our "not appropriate" responses. In this way, the study generated 67 unique (question, robocall response) pairs.

Since this dataset was too small to finetune a model and the number of unique robocall messages was limited, the study performed data augmentation on the 67 unique robocall responses. For each robocall response, the study generated two more augmented texts using the techniques in to yield 201 (question, response) "not appropriate" pairs for each question from the "Relevance" question pool. To generate the appropriate pairs, for each question from the "Relevance" question pool, the study used quora to collect appropriate human responses to these questions. The study augmented the (question, human response) pairs in the same way. Upon generating the appropriate and not appropriate pairs, the study generated the sentence embedding pairs in the similar fashion described above. The (question embedding, and response embedding) pairs were then passed to finetune our base model. Table 4 shows the test accuracy of the finetuned model.

TABLE 4

| Accuracy | First 10 words | First 20 words | First 30 words | First 40 words |
|---|---|---|---|---|
| Overall | 91.02% | 97.18% | 98.32% | 97.21% |
| Robocall | 92.5% | 98.46% | 100% | 98.49% |
| Human Call | 87.23% | 93.62% | 93.62% | 93.62% |

Example Elaboration Detector Development

Elaboration Detector. The study developed an example of the elaboration detector module (e.g., 134*c*) that can determine if the response provided by the caller for a follow up question is appropriate or not. Examples of follow up questions include "How can I help you?" or "Tell me more about it."

Figure 3D:
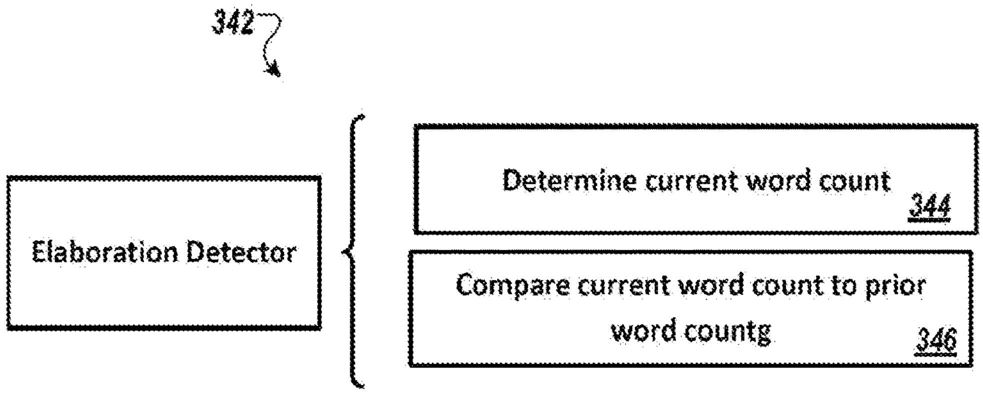
FIG. 3D shows an example operation of an elaboration detector of an example non-person caller detector of FIG. 1A, 1B, or 1C in accordance with an illustrative embodiment.

FIG. 3D shows an example method 342 of operation of the elaboration detector developed in the study.

While text summarization via natural language processing (e.g., described in [54]-[56]) could be used, the study employed a less complex implementation (that could avoid having to rely on a large number of data and complex architecture) based on the length of the caller's response. The study developed a detector that can count (344) the number of words in the caller's response. If detector determine (346) that the number of words in the current response is higher than the number of words in the previous response, then it labels the caller response as "appropriate," otherwise "inappropriate." While a naive approach may not consider the semantic meaning of the responses, the study understood that the detector (e.g., 134*c*) developed in this manner would operate in combination with other detectors to make a final decision. To this end, individual components can compensate for their individual performance with operations from other components. Indeed, in other embodiments, more complex classifiers, including those described herein, can alternatively be employed.

Example Name Detector Training

Name Recognizer. The study developed an example of the name recognition detector module (e.g., 134*d*) that can determine whether a correct name in provided in response to the inquiry of the recipient of interest.

Figure 3E:
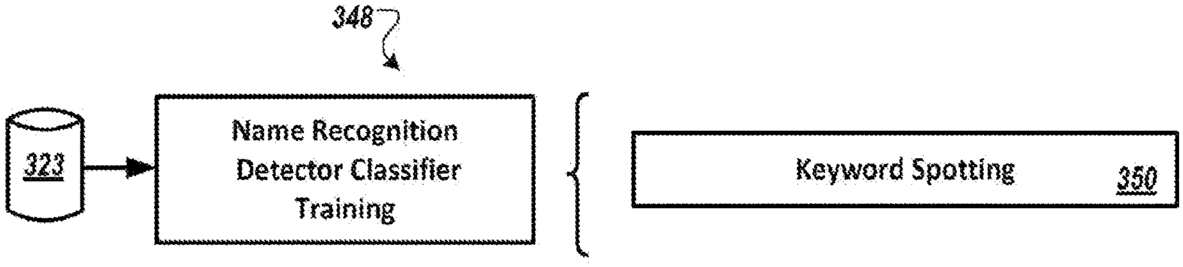
FIG. 3E shows an example operation of a name recognition detector of an example non-person caller detector of FIG. 1A, 1B, or 1C in accordance with an illustrative embodiment.
Figure 3F:
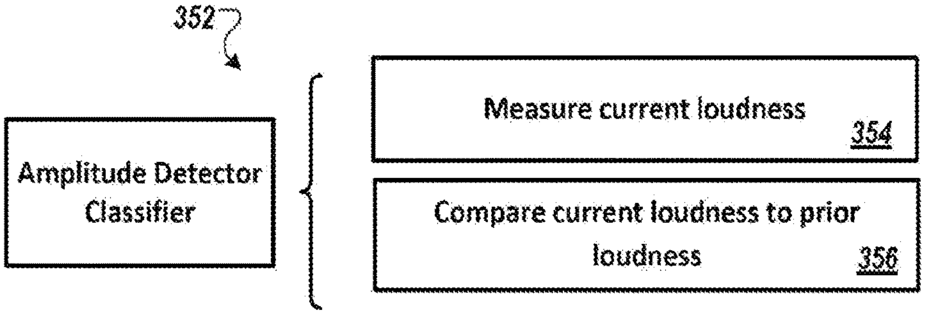
FIG. 3F shows an example operation of an amplitude detector of an example non-person caller detector of FIG. 1A, 1B, or 1C in accordance with an illustrative embodiment.

FIG. 3E shows an example method 348 to build the name detector classifier (e.g., 134*d*). The name recognition detector module (e.g., 134*d*) can be invoked by the controller when the non-person caller detector (e.g., 110) inquires the caller to provide the name of the callee. The name recognition detector module (e.g., 134*d*) can determine whether the correct name was spoken. In the study, the system allowed the user to set the name(s) that should be accepted as correct. The users could set multiple correct names as a valid recipient of phone calls coming to their devices. During a phone call, if the caller was asked to provide the callee's name, the name recognition detector module was used to determine if the correct name was provided. Based on the caller's response, the name recognition detector module assigned a label (appropriate/not appropriate) and a confidence score to it. In the study, the name recognition detector module employed a keyword spotting algorithm (350) that could detect the correct name(s) of the callee as the right keyword. The study employed the Snowboy algorithm to recognize the name, which was trained with 3 audio samples to create a model to detect the keyword. The study then embedded the trained model in the NR module to recognize the correct name(s). Because Snowboy does not provide a confidence score, the name recognition detector module was configured to generate a fixed value as the accuracy of Snowboy (0.83) as a fixed confidence score for every label.

Example Amplitude Detector Analysis

Amplitude Detector. The study developed an example of the amplitude detector module (e.g., 134*e*) that can request the caller to speak up. The amplitude detector module (e.g., 134*e*) is configured to measure (354) the current loudness or the average amplitude of the audio of the caller's response. The amplitude detector module (e.g., 134*e*) then determines (356) if the caller has spoken louder in response to the request. If the average amplitude is higher by defined offset (e.g., error margin=0.028) than the caller's previous response, the amplitude detector module labels the response as an appropriate response, otherwise, the response is inappropriate.

Example Repetition Detector Analysis

Repetition Detector. The study developed an example of the repetition detector module (e.g., 134*f*) that can ask the caller to repeat what just said. The repetition detector module (e.g., 134*f*) can be invoked by the controller after the non-person caller detector (e.g., 110) asks the caller to repeat what he/she just said. Once the caller was done responding to the repetition request, the repetition detector module (e.g., 134*f*) could compare (i) the caller's current response to (ii) the immediate last response to determine if the current response is a repetition of the immediate last response.

Figure 3G:
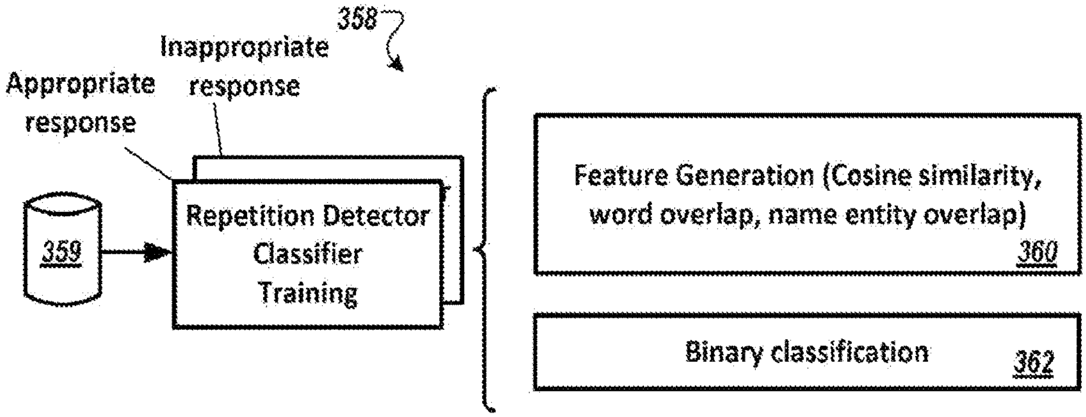
FIG. 3G shows an example operation of a repetition detector of an example non-person caller detector of FIG. 1A, 1B, or 1C in accordance with an illustrative embodiment.

FIG. 3G shows an example method 358 to build the repetition detector classifier (e.g., 134*f*) using a binary classifier. The binary classifier is configured to, for a given (current response, last response) pair, assign the label "appropriate" if the current response is a semantic repetition of last response and "not appropriate" if not.

Dataset: To build such a classifier, the study collected (current response, last response) pairs from Lenny recordings as the training data set 359. Lenny is a bot (a computer program) configured to play a set of pre-recorded voice messages to interact with spammers. The dataset included more than 600 publicly available call recordings where Lenny interacts with human spammers (telemarketers, debt collectors, etc.). During the conversation in the dataset, Lenny asked the callers to repeat themselves multiple times. Among 600+ publicly available call recordings, the study randomly selected 160 call recordings and manually transcribed the parts where the callers repeated themselves. Specifically, the study created 160 (current response, last response) pairs and assigned them the "appropriate" label. Since the telemarketers talking to Lenny are human callers, when asked to repeat themselves, they provide a semantic, if not the exact, repetition of their last statement. It is expected most legitimate human callers behave in the same way.

The study considered a second classifier to assess whether the response was inappropriate. The study additionally generated "not appropriate" (current response, last response) pairs for each last response. The study randomly selected a current response from the Lenny transcripts, which is not an appropriate repetition to generate 160 not appropriate pairs.

Repetition Classifier: The study extracted three features (356) from the data points generated: Cosine similarity, word overlap, and named entity overlap.

The evaluated system was configured to calculate the cosine similarity between the current response and the last response. The cosine similarity feature is a measure of similarity between two non-zero vectors of an inner product space that measures the cosine of the angle between them. Upon removing stop words and punctuation, the evaluated system was configured to calculate the number of words overlapped (i.e., word overlap feature) between the current response and the last response. Upon removing stop words and punctuation, the evaluated system was configured to calculate the number of named entities in the current response and last response. During the information extraction, a named entity is a real-world object, such as persons, locations, organizations, products, etc., that can be denoted with a proper name. The study used Spacy to extract the named entities and then calculated the number of named entities overlapped (i.e., named entity overlap feature) between the current response and the last response.

It was observed that the evaluated system could determine if a statement1 is a semantic repetition of statement2 without using resource-intensive machine learning models. Five different classifiers were trained (362) using the cosine similarity, word overlap, and named entity overlap three features.

The study evaluated a number of different classifiers, including SVM, Logistic Regression, Random Forest, XG Boost, and neural works, and employed Random Forest for the detector in the study. The hyperparameters for Random Forest model included $min_{samples\_leaf}=20$ and $n_{estimators}=100$. To generate the robocall test set, the study took 79 representative robocalls messages and generated (current response, last response) pairs by setting the first sentence and second sentence from the robocall messages as current response and last response respectively. Since, in this dataset, none of the current responses are semantic repetitions of the last responses, these pairs were labeled as a "not appropriate" response.

Table 5 shows the test accuracies and false positive rates for each classifier. Table 5 also shows how the classifier performs on the robocall test set.

TABLE 5

| | Text Accuracy | Robo Test Accuracy | FPR |
|---|---|---|---|
| SVM | 94% | 82% | 12.5% |
| Logistic Regression | 93.6% | 85% | 12.5% |
| Random Forest | 95% | 86% | 6.25% |
| XG Boost | 95% | 85% | 9.4% |
| Neural Network | 93.7% | 83% | 12.5% |

Example Intent Detector Analysis

Affirmative Negative Intent Recognizer. The study developed an example of the intent detector module (e.g., 134*g*) that can evaluate the appropriateness of a reply for affirmation of the caller's intent, e.g., in reply to a follow-up question of "Who are you trying to reach?" to confirm the name. The intent detector module (e.g., 134*g*) can ask the caller to confirm by saying the correct name or evaluate whether the incorrect name was spoken. For example, if the first response was "Taylor," the intent detector module (e.g., 134*g*) may inquire, "Did you mean Taylor?" as an expected affirmative answer from a human caller. Another question is asking the caller to confirm the name by intentionally saying an incorrect name, such as, "Did you mean Tiffany?" In the second scenario and associated evaluation, the intent detector module (e.g., 134*g*) would expect a negative answer from a human caller. Based on the question and the expected response from the caller, the intent detector module (e.g., 134*g*) can label a response from the caller as inappropriate and appropriate.

Figure 3H:
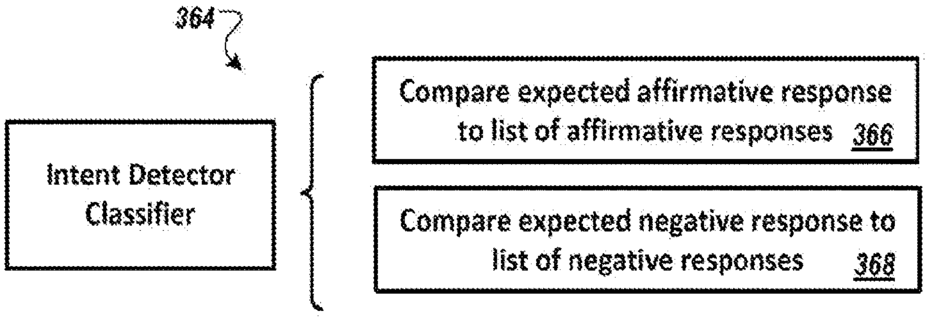
FIG. 3H shows an example operation of an intent detector of an example non-person caller detector of FIG. 1A, 1B, or 1C in accordance with an illustrative embodiment.

FIG. 3H shows an example method 364 of operation of the intent detector module (e.g., 134*g*). The study manually compiled a list of affirmative utterances (e.g., yes, yeah, true, etc.) and negative utterances (e.g., no, not, etc.). If an affirmative answer was expected and the caller's response contained any of the affirmative words, the study labeled the caller's response as an appropriate response (see 366). Similarly, if a negative answer was expected and the caller's response contained any of the negative words, the study labeled the caller's response as an appropriate response (see 368). All other cases were also labeled as inappropriate responses.

Example Silence Detector Analysis

Silence Detector. The study developed an example of the silence detector module (e.g., 134*h*) that can be invoked by the controller to request the caller to hold/pause speaking. In the study, the silence detector module (e.g., 134*h*) was configured to randomly select a hold time, $t_s$, e.g., ranging between five to ten seconds, to ask the caller to hold and comes back to the caller to continue the conversation after $t_s$ seconds. Human callers are expected to eventually stop talking when asked to hold and keep silent until the callee returns during a phone call. To this end, the study configured the module to detect if the caller has become silent during the $t_s$ seconds they were asked to hold.

To determine whether the caller responded appropriately when put on hold, the study configured the silence detector module (e.g., 134*h*) to determine if the caller was silent during at least half of the holding time, $t_s$. The study evaluated a Voice Activity Detection (VAD) to detect silence. It was observed the implementation generated several instances of false positives.

The study further developed another implementation of the silence detector module (e.g., **134*h***) that is configured to transcribe all utterances stated by the caller during the $t_s$ second period and to calculate the average number of words said per second, $w_{ps}$. If the average number of words $w_{ps}$ was less than a pre-defined threshold $\theta_s$, the study per the silence detector module labeled the response as appropriate. The study established the threshold $\theta_s$ by calculating the average number of words spoken per second $aw_{ps}$ from a collection of pre-recorded robocall recordings and set $\theta_s = (t_s \times aw_{pos})/2$.

Results

The study measured the accuracy of decisions made by the prototyped system.

The results show that the developed system was effectiveness against robocalls in the defined threat model. The study also evaluated the usability of the system.

Usability Study. The study was designed to evaluate a system that could (i) provide the convenience of a human assistant while detecting robocalls and (ii) provide context for calls to assist the callee in deciding if a call needs his/her attention and preserve user experience. In the study, 20 study participants were evaluated.

The study performed two experiments, one where the callers knew the name of the callee and one where the caller didn't know the name of the callee. During the first experiment, the study preset the correct name instead of having each user set a name. The study recruited 15 out of our 20 users for this experiment and provided four topics to make the four simulated phone calls. The topics were selected such that it is natural for a phone call setting and common in real-life scenarios. The study chose the last two topics to be in overlap with robocall topics (free cruise and car warranty). Since human callers were interacting with the system, it was expected that the calls would be forwarded even when the call topics overlapped with the robocall topics. This provided evidence that the system does not conservatively block calls containing words that might be present in robocall messages.

During the second experiment, the caller was either given an incorrect name or no name at all. The study collected information about phone usage and previous experience regarding robocalls from our users.

It was observed that most of the users (81.3%) were able to answer the questions asked by the system in the study without difficulty. Only 10% of users reported that they had difficulty answering the questions. It was also observed that while certain users initially mentioned that they felt unfamiliar with the system, the response changed after 1-2 tries. The study asked users if the number of questions they had to answer was acceptable; 5% of users reported that it was not acceptable. The study evaluated the number of questions the system asked during its interaction with the users in the study and observed that in 67% of the cases, the system made a decision by asking up to three questions. 83% of the users reported that 3 questions were acceptable. The study observed that 8.8% of user indicated the time they spent interacting with the virtual assistant before their call was forwarded/blocked was unacceptable.

The study measured false positives, defined as the percentage of calls from human callers that were mistakenly blocked, e.g., calls from human callers that were deemed as robo-callers. The study used the data collected during the user study. Twenty (20) users made 80 calls in total, and only 7 calls were blocked, yielding an overall false positive rate of 8.75%, mainly due to the silence detection and the name recognition detection.

Discussion

The exemplary system and method can be thought of as a conversational agent that makes a quick conversation with the callers and makes a decision based on their responses. There has been a considerable amount of research conducted on conversational agents in the field of natural language processing [45]-[47]. Over the past few years, conversational assistants, such as Apple's Siri, Microsoft's Cortana, Amazon's Echo, Google's Now, and a growing number of new services, have become a part of people's lives. However, due to the lack of fully automated methods for handling the complexity of natural language and user intent, these services are largely limited to answering a small set of common queries involving topics like weather forecasts, driving directions, finding restaurants, and similar requests. Conversational agents such as Apple's Siri demonstrated their capability of understanding speech queries and helping with users' requests. However, all of these intelligent agents are limited in their ability to understand their users, and they fall short of the reflexive and adaptive interactivity that occurs in most human-human conversation [48]. Huang et. al. discusses the challenges (such as identifying user intent, and having clear interaction boundaries) associated with such agents. RobocallGuardPlus consists of multiple modules that examine the caller's responses. These modules determine if a response is, in fact, an appropriate response to the question asked. Building natural language models present numerous challenges. First, a large annotated dataset is required to build highly accurate NLP models. However, the dataset consisting of robocall messages is limited and small in size. Moreover, human responses to secretary-like questions is also limited. Hence, building an effective virtual assistant from a limited dataset becomes challenging.

Second, models that have the capability of fully understanding natural language and user intent tend to be very complex and is still an area of ongoing research in the field of natural language processing. Also, the system can intend RobocallGuardPlus to be used in real-time in a phone.

Therefore the models should be lightweight, which adds another challenge for us. Finally, most of the work on conversational agents has focused on usability and how the conversation can be made more human-like. However, the system can need to strike a balance between usability and security since RobocallGuardPlus is designed to face both human callers and robocallers. Having the conversational agent succeed in an adversarial environment while at the same time being user-friendly to human callers is even more challenging.

It has been shown that phone blacklisting methods provided by smartphone apps (e.g., Truecaller, Nomorobo, Youmail, Hiya, etc.) or telephone carriers (e.g., call protect services offered by AT&T, Verizon, etc.) can be helpful. However, these services typically rely on historical data such as user complaints or honeypot-generated information, and their overall effectiveness tends to be low due to caller ID spoofing. A number of research studies, and reported in publications, have explored caller ID authentication. The Federal Communications Commission (FCC) has mandated US telecom companies to start using a suite of protocols and procedures (referred to as SHAKEN/STIR) intended to combat caller ID spoofing on public telephone networks. The protocols and procedures enable the callee to verify the correctness of the caller ID. However, such protocols and procedures may be limited when the calls originate outside of the United States or if the recipient of the call does not have caller ID spoofing services.

Another call screening operation is made available on the Google Pixel phone app that allows users to screen their incoming calls prior to picking them up. When an incoming call arrives, the user is prompted with three options: answer, decline, and screen. If the screen option is selected, Google Assistant then engages with the caller to collect an audio sample and generates a transcript of the ongoing call. Hence users are notified (i.e., the phone rings) of all incoming calls (including robocalls), and user intervention is needed to screen such calls. In the latest version of the Phone app, Google allows an automatic call screen feature, thus enabling the elimination of user intervention if the user chooses to do so. This feature claims to block robocalls on behalf of the user. Upon picking up the call, Google Assistant screens the call and asks who's calling and why. Call Screen can detect robocalls and spam calls from numbers in Google's spam database. A detected spam call is then declined without alerting the user.

Call distribution techniques (Robokiller) include an Answer Bot that detects spam calls by forwarding all incoming calls to a server, which accepts each call and analyzes its audio to determine if the audio source is a recording. Once the call is determined to come from a human, it is forwarded back to the user. Robokiller performs audio analysis techniques to detect robocalls. However, these techniques can be evaded by a sophisticated robo-caller.

Example Usage. To address the increasing number of unwanted or fraudulent phone calls, a number of call-blocking applications are available commercially, some of which are used by hundreds of millions of users (Hiya, Truecaller, Youmail etc.). Although such call-blocking apps are the only solutions for users that block or warn users about spam calls, their performance suffers with an increased amount of caller ID spoofing. Such spoofing is easy to achieve, and robo-callers have resorted to tricks like neighbor spoofing (caller ID is similar to the targeted phone number) to overcome call blocking and to increase the likelihood that the targeted user will pick up the call.

A majority of robocallers now rely on neighbor spoofing that helps them to effectively evade such blacklists. Since RobocallGuard does not solely rely on blacklists, it can block robocalls from spoofed callers.

The Call Screen feature available on the Google Pixel phone app provides call context to the user via a real-time transcript of the call audio. In the latest version of the Phone app, Google allows an automatic call screen feature, thus enabling the elimination of user intervention if the user chooses to do so. This feature also claims to block robocalls on behalf of the user. However, from the conducted experiments, it was observed that Google's call screening mostly relies on caller IDs, thus blocking calls from known robo-callers. It thus fails to block robocalls from spoofed caller IDs even when the call content is spam. Moreover, once adopted by a large number of users, Call Screen appears to be evade-able by future robo-callers that can bypass Google Assistant and reach their targets. Conducted experiments showed that instead of initially providing the spam content, robo-callers can simply provide a benign message when asked about the purpose of the call, thus evading detention by Google Assistant.

In contrast, the exemplary system disclosed herein can be addressed meaningfully by current mass robo-callers even in the presence of caller ID spoofing. Since the system does not mainly rely on blacklists, though blacklist operations may be a part of the system, in some embodiments, it can effectively block spam content from spoofed robo-callers. Moreover, a study was conducted that the security analysis showed the exemplary system to be effective against future robocallers who might try to evade RobocallGuardPlus once deployed.

As noted above, Robokiller, a smartphone application, employs an Answer Bot that detects spam calls by forwarding all incoming calls to a server, which accepts each call and analyzes its audio to determine if the audio source is a recording. Once the call is determined to come from a human, it is forwarded back to the user. In Robokiller, a caller continues to hear rings while the call is picked up, analyzed, and forwarded back to the user, which could negatively impact legitimate callers. Also, the audio analysis techniques used by Robokiller are countered by more sophisticated robo-callers that use voice activity detection. In an attempt to fool their victims, current robo-callers employ evasive techniques like mimicking human voice, not speaking until spoken to, etc. Hence, the defense mechanisms used by Robokiller are not enough to detect such evasive attackers.

In contrast, the exemplary system can preserve the user experience and can be effective against robocallers that employ audio evasion techniques. Experiments conducted in the study showed that the current implementations of both Robokiller and Google's call screens rely on caller IDs to block robo-callers. Therefore such systems are easily evaded by spoofed robo-callers. Currently, there is no such system that makes an involved conversation with the caller through multiple interactions and blocks robocalls based on the call content and the interaction pattern.

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Machine Learning. In addition to the machine learning features described above, the various analysis system can be implemented using one or more artificial intelligence and machine learning operations. The term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as an input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tan h, or rectified linear unit (ReLU), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an ANN is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., error such as L1 or L2 loss), during training. This disclosure contemplates that any algorithm that finds the minimum of the cost function can be used. LR classifiers are known in the art and are therefore not described in further detail herein.

An Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" may be any applicable human, animal, or another organism, living or dead, or other biological or molecular structure or chemical environment, and may relate to particular components of the subject, for instance, specific tissues or fluids of a subject (e.g., human tissue in a particular area of the body of a living subject), which may be in a particular location of the subject, referred to herein as an "area of interest" or a "region of interest."

It should be appreciated that, as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to humans (e.g., rat, dog, pig, monkey), etc. It should be appreciated that the subject may be any applicable human patient, for example.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth 10 references in the list. All references cited and discussed in this specification are incorporated herein by reference in their entireties and to the same extent as if each reference was individually incorporated by reference.

REFERENCES

[1] "4.82 Billion Robocalls Mark 1.7% Rise in February, Says YouMail Robocall Index," https://www.prnewswire.com/newsreleases/4-82-billion-robocalls-mark-1-7-rise-in-february-saysyoumail-robocall-index-301017189.html, Mar. 5, 2020, [accessed: 2021 Sep. 19].

[2] N. Miramirkhani, O. Starov, and N. Nikiforakis, "Dial one for scam: A large-scale analysis of technical support scams," arXiv preprint arXiv: 1607.06891, 2016.

[3] S. Pandit, R. Perdisci, M. Ahamad, and P. Gupta, "Towards measuring the effectiveness of telephony blacklists." in NDSS, 2018.

[4] C. Cimpanu, "Fcc tells us telcos to implement caller id authentication by Jun. 30, 2021," https://www.zdnet.com/article/fcc-tellsus-telcos-to-implement-caller-id-authentication-by-june-30-2021/, March 2020.

[5] "Combating spoofed robocalls with caller id authentication," https://www.fcc.gov/call-authentication, April 2021, [accessed: 2021 Sep. 19].

[6] "Perspectives: Why we're still years away from a robocallfree future," https://www.cnn.com/2019/04/10/perspectives/stoprobocalls-shaken-stir/index.html, Apr. 10, 2019, [accessed: 2021 Sep. 19].

[7] M. Cohen, E. Finkelman, E. Garr, and B. Moyles, "Call distribution techniques," U.S. Pat. No. 9,584,658, issued Feb. 28, 2017.

[8] H. Tu, A. Doup'e, Z. Zhao, and G.-J. Ahn, "Sok: Everyone hates robocalls: A survey of techniques against telephone spam," in 2016 IEEE Symposium on Security and Privacy (SP). IEEE, 2016, pp. 320-338.

[9] M. Sahin, A. Francillon, P. Gupta, and M. Ahamad, "Sok: Fraud in telephony networks," in 2017 IEEE European Symposium on Security and Privacy (EuroS&P). IEEE, 2017, pp. 235-250.

[10] A. Costin, J. Isacenkova, M. Balduzzi, A. Francillon, and D. Balzarotti, "The role of phone numbers in understanding cybercrime schemes," in 2013 Eleventh Annual Conference on Privacy, Security and Trust. IEEE, 2013, pp. 213-220.

[11] B. Srinivasan, A. Kountouras, N. Miramirkhani, M. Alam, N. Nikiforakis, M. Antonakakis, and M. Ahamad, "Exposing search and advertisement abuse tactics and infrastructure of technical support scammers," in Proceedings of the 2018 World Wide Web Conference, 2018, pp. 319-328.

[12] M. Bidgoli and J. Grossklags, ""hello. this is the irs calling.": A case study on scams, extortion, impersonation, and phone spoofing," in 2017 APWG Symposium on Electronic Crime Research (eCrime). IEEE, 2017, pp. 57-69.

[13] "Truecaller," https://www.truecaller.com/, accessed: 2021 Sep. 19.

[14] "Nomorobo," https://www.nomorobo.com/, accessed: 2021 Sep. 19.

[15] "Youmail," https://www.youmail.com/, accessed: 2021 Sep. 19.

[16] "Hiya," https://www.hiya.com/, accessed: 2021 Sep. 19.

[17] "At&t," https://www.att.com/features/security-apps.html, accessed: 2021 Sep. 19.

[18] "Verizon," https://www.verizon.com/support/residential/homephone/callingfeatures/stop-unwanted-calls, accessed: 2021 Sep. 19.

[19] B. Srinivasan, P. Gupta, M. Antonakakis, and M. Ahamad, "Understanding cross-channel abuse with sms-spam support infrastructure attribution," in European Symposium on Research in Computer Security. Springer, 2016, pp. 3-26.

[20] H. Li, X. Xu, C. Liu, T. Ren, K. Wu, X. Cao, W. Zhang, Y. Yu, and D. Song, "A machine learning approach to prevent malicious calls over telephony networks," in 2018 IEEE Symposium on Security and Privacy (SP). IEEE, 2018, pp. 53-69.

[21] "Neighbor scam moves on to spoofing just area codes," https://hiya.com/blog/2018/05/23/neighbor-scam-moves-on-to-spoofing-justarea-codes/, May 23, 2018, accessed: 2021 Sep. 19.

[22] H. Mustafa, W. Xu, A. R. Sadeghi, and S. Schulz, "You can call but you can't hide: detecting caller id spoofing attacks," in 2014 44th Annual IEEE/IFIP International Conference on Dependable Systems and Networks. IEEE, 2014, pp. 168-179.

[23] B. Reaves, L. Blue, H. Abdullah, L. Vargas, P. Traynor, and T. Shrimpton, "Authenticall: Efficient identity and content authentication for phone calls," in 26th {USENIX} Security Symposium ({USENIX} Security 17), 2017, pp. 575-592.

[24] B. Reaves, L. Blue, and P. Traynor, "Authloop: End-to-end cryptographic authentication for telephony over voice channels," in 25th {USENIX} Security Symposium ({USENIX} Security 16), 2016, pp. 963-978.

[25] H. Tu, A. Doup'e, Z. Zhao, and G.-J. Ahn, "Toward authenticated caller id transmission: The need for a standardized authentication scheme in q. 731.3 calling line identification presentation," in 2016 ITU Kaleidoscope: ICTs for a Sustainable World (ITU WT). IEEE, 2016, pp. 1-8.

[26] "Secure Telephony Identity Revisited, IETF Working Group," https://tools.ietf.org/wg/stir/, [accessed: 2021 Sep. 19].

[27] "Shaken/Stir," https://transnexus.com/whitepapers/understandingstir-shaken/, [accessed: 2021 Sep. 19].

[28] "Shaken/Stir CNN," https://www.cnn.com/2021/07/02/tech/robocallprevention-stir-shaken/index.html, Jul. 2, 2021, [accessed: 2021 Sep. 19].

[29] H. Tu, A. Doup'e, Z. Zhao, and G.-J. Ahn, "Users really do answer telephone scams," in 28th {USENIX} Security Symposium ({USENIX} Security 19), 2019, pp. 1327-1340.

[30] I. N. Sherman, J. Bowers, K. McNamara Jr, J. E. Gilbert, J. Ruiz, and P. Traynor, "Are you going to answer that? measuring user responses to anti-robocall application indicators." in NDSS, 2020.

[31] H. Meutzner, S. Gupta, V.-H. Nguyen, T. Holz, and D. Kolossa, "Toward improved audio captchas based on auditory perception and language understanding," ACM Transactions on Privacy and Security (TOPS), vol. 19, no. 4, pp. 1-31, 2016.

[32] J. Tam, J. Simsa, S. Hyde, and L. V. Ahn, "Breaking audio captchas," in Advances in Neural Information Processing Systems, 2008, pp. 1625-1632.

[33] E. Bursztein and S. Bethard, "Decaptcha: breaking 75% of ebay audio captchas," in Proceedings of the 3rd USENIX conference on Offensive technologies, vol. 1, no. 8. USENIX Association, 2009, p. 8.

[34] E. Bursztein, R. Beauxis, H. Paskov, D. Perito, C. Fabry, and J. Mitchell, "The failure of noise-based non-continuous audio captchas," in 2011 IEEE symposium on security and privacy. IEEE Computer Society, 2011, pp. 19-31.

[35] S. Li, S. A. H. Shah, M. A. U. Khan, S. A. Khayam, A.-R. Sadeghi, and R. Schmitz, "Breaking e-banking captchas," in Proceedings of the 26th Annual Computer Security Applications Conference, 2010, pp. 171-180.

[36] S. Solanki, G. Krishnan, V. Sampath, and J. Polakis, "In (cyber) space bots can hear you speak: Breaking audio captchas using ots speech recognition," in Proceedings of the 10th ACM Workshop on Artificial Intelligence and Security, 2017, pp. 69-80.

[37] V. Fanelle, S. Karimi, A. Shah, B. Subramanian, and S. Das, "Blind and human: Exploring more usable audio captcha designs," in Sixteenth Symposium on Usable Privacy and Security (SOUPS 2020), 2020, pp. 111-125.

[38] N. Mrkˇsi'c, D. O. S'eaghdha, T.-H. Wen, B. Thomson, and S. Young, "Neural belief tracker: Data-driven dialogue state tracking," arXiv preprint arXiv: 1606.03777, 2016.

[39] Z. Yan, N. Duan, J. Bao, P. Chen, M. Zhou, Z. Li, and J. Zhou, "Docchat: An information retrieval approach for chatbot engines using unstructured documents," in Proceedings of the 54th Annual Meeting of the Association for Computational Linguistics (Volume 1: Long Papers), 2016, pp. 516-525.

[40] L. Zhou, J. Gao, D. Li, and H.-Y. Shum, "The design and implementation of xiaoice, an empathetic social chatbot," Computational Linguistics, vol. 46, no. 1, pp. 53-93, 2020.

[41] J. Weizenbaum, "Eliza—a computer program for the study of natural language communication between man and machine," Communications of the ACM, vol. 9, no. 1, pp. 36-45, 1966.

[42] C.-W. Liu, R. Lowe, I. V. Serban, M. Noseworthy, L. Charlin, and J. Pineau, "How not to evaluate your dialogue system: An empirical study of unsupervised evaluation metrics for dialogue response generation," arXiv preprint arXiv: 1603.08023, 2016.

[43] K. Gopalakrishnan, B. Hedayatnia, Q. Chen, A. Gottardi, S. Kwatra, A. Venkatesh, R. Gabriel, D. Hakkani-T"ur, and A. A. AI, "Topical-chat: Towards knowledge-grounded open-domain conversations." in INTERSPEECH, 2019, pp. 1891-1895.

[44] I. V. Serban, R. Lowe, P. Henderson, L. Charlin, and J. Pineau, "A survey of available corpora for building data-driven dialogue systems," arXiv preprint arXiv: 1512.05742, 2015.

[45] A. Sciuto, A. Saini, J. Forlizzi, and J. I. Hong, "hey alexa, what's up?" a mixed-methods studies of in-home conversational agent usage," in Proceedings of the 2018 Designing Interactive Systems Conference, 2018, pp. 857-868.

[46] P. Shah, D. Hakkani-T"ur, G. T"ur, A. Rastogi, A. Bapna, N. Nayak, and L. Heck, "Building a conversational agent overnight with dialogue self-play," arXiv preprint arXiv: 1801.04871, 2018.

[47] C. Khatri, A. Venkatesh, B. Hedayatnia, R. Gabriel, A. Ram, and R. Prasad, "Alexa prize state of the art in conversational ai," AI Magazine, vol. 39, no. 3, pp. 40-55, 2018.

[48] L. Clark, N. Pantidi, O. Cooney, P. Doyle, D. Garaialde, J. Edwards, B. Spillane, E. Gilmartin, C. Murad, C. Munteanu et al., "What makes a good conversation? challenges in designing truly conversational agents," in Proceedings of the 2019 CHI Conference on Human Factors in Computing Systems, 2019, pp. 1-12.

[49] T.-H. K. Huang, W. S. Lasecki, A. Azaria, and J. P. Bigham, "is there anything else i can help you with?" challenges in deploying an on-demand crowd-powered conversational agent," in Fourth AAAI Conference on Human Computation and Crowdsourcing, 2016.

[50] A. Wald, "Sequential tests of statistical hypotheses," The annals of mathematical statistics, vol. 16, no. 2, pp. 117-186, 1945.

[51] "Google speech," https://cloud.google.com/speech-to-text/, accessed: 2020 Sep. 26.

[52] D. Povey, A. Ghoshal, G. Boulianne, L. Burget, O. Glembek, N. Goel, M. Hannemann, P. Motlicek, Y. Qian, P. Schwarz et al., "The kaldi speech recognition toolkit," in IEEE 2011 workshop on automatic speech recognition and understanding, no. CONF. IEEE Signal Processing Society, 2011.
[53] "Deep speech," https://github.com/mozilla/DeepSpeech, accessed: 2020 Sep. 26.
[54] M. Allahyari, S. Pouriyeh, M. Assefi, S. Safaei, E. D. Trippe, J. B. Gutierrez, and K. Kochut, "Text summarization techniques: a brief survey," arXiv preprint arXiv: 1707.02268, 2017.
[55] M. Gambhir and V. Gupta, "Recent automatic text summarization techniques: a survey," Artificial Intelligence Review, vol. 47, no. 1, pp. 1-66, 2017.
[56] Y. Liu and M. Lapata, "Text summarization with pretrained encoders," ar Xiv preprint arXiv: 1908.08345, 2019.
[57] T. Mikolov, K. Chen, G. Corrado, and J. Dean, "Efficient estimation of word representations in vector space," arXiv preprint arXiv: 1301.3781, 2013.
[58] J. Pennington, R. Socher, and C. D. Manning, "Glove: Global vectors for word representation," in Proceedings of the 2014 conference on empirical methods in natural language processing (EMNLP), 2014, pp. 1532-1543.
[59] M. E. Peters, M. Neumann, M. Iyyer, M. Gardner, C. Clark, K. Lee, and L. Zettlemoyer, "Deep contextualized word representations," arXiv preprint arXiv: 1802.05365, 2018.
[60] P. Bojanowski, E. Grave, A. Joulin, and T. Mikolov, "Enriching word vectors with subword information," Transactions of the Association for Computational Linguistics, vol. 5, pp. 135-146, 2017.
[61] A. Conneau, D. Kiela, H. Schwenk, L. Barrault, and A. Bordes, "Supervised learning of universal sentence representations from natural language inference data," arXiv preprint arXiv: 1705.02364, 2017.
[62] J. Chen, Y. Wu, and D. Yang, "Semi-supervised models via data augmentationfor classifying interactive affective responses," arXiv preprint arXiv: 2004.10972, 2020.
[63] M. Sahin, M. Relieu, and A. Francillon, "Using chatbots against voice spam: Analyzing lenny's effectiveness, " in Thirteenth Symposium on Usable Privacy and Security ({SOUPS} 2017), 2017, pp. 319-337.
[64] "Spacy," https://spacy.io/, accessed: 2020 Sep. 26.
[65] V. Keselj, "Speech and language processing daniel jurafsky and james h. martin (stanford university and university of colorado at boulder) pearson prentice hall, 2009, xxxi+988 pp; hardbound, isbn 978-0-13-187321-6," 2009.

What is claimed is:

1. A system comprising:
a processor; and
a memory having instructions stored thereon, wherein execution of the instructions by the processor causes the processor to:
initiate a telephony or VOIP session with a caller telephony or VOIP device;
generate a first audio output over the telephony or VOIP session associated with a first caller detector analysis;
following the generating of the first audio output and in response to a first audio input being received, generate a first transcription or natural language processing data of the first audio input;
determine via the first caller detector analysis whether the first audio input is an appropriate response for a first context evaluated by the first caller detector analysis;
generate a second audio output over the telephony or VOIP session associated with a second caller detector analysis;
following the generating of the second audio output and in response to a second audio input being received, generate a second transcription or natural language processing data of the first audio input;
determine via the second caller detector analysis whether the second audio input is an appropriate response for a second context evaluated by the second caller detector analysis;
determine a score for the telephony or VOIP device; and
initiate a second telephony or VOIP session with a user's telephony or VOIP device based on the determination, or direct the telephony or VOIP session with the caller telephony or VOIP device to end a call or to a voicemail.

2. The system of claim 1, wherein the instructions further cause the processor to generate a notification of the telephony or VOIP session with the caller telephony or VOIP device.

3. The system of claim 1, wherein the instructions further cause the processor to:
generate a third audio output over the telephony or VOIP session associated with a third caller detector analysis;
following the generating of the third audio output and in response to a third audio input being received, generate a third transcription or natural language processing data of the third audio input; and
determine, via the third caller detector analysis, whether the third audio input is an appropriate response for a third context evaluated by the third caller detector analysis.

4. The system of claim 3, wherein the first, second, or third caller detector analysis includes a context analysis employing a semantic clustering-based classifier.

5. The system of claim 4, wherein the first, second, or third caller detector analysis includes a relevance analysis employing a semantic binary classifier trained using a (question, response) pair.

6. The system of claim 5, wherein the semantic binary classifier or the semantic clustering-based classifier employs a neural network model.

7. The system of claim 3, wherein the first, second, or third caller detector analysis includes an elaboration analysis employing a keyword spotting algorithm.

8. The system of claim 3, wherein the first, second, or third caller detector analysis includes an elaboration detector employing a current word count of a current response compared to a determined word count of a prior response as one of the first, second, or third transcription or natural language processing data.

9. The system of claim 3, wherein the first, second, or third caller detector analysis includes an amplitude detector employing an average amplitude evaluation of any one of the first, second, or third audio input.

10. The system of claim 3, wherein the first, second, or third caller detector analysis includes a repetition detector employing one or more features selected from the group consisting of a cosine similarity determining, a word overlap determination, and named entity overlap determination.

11. The system of claim 3, wherein the first, second, or third caller detector analysis includes an intent detector employing a comparison of the first, second, or third transcription or natural language processing data to a predefined list of pre-defined affirmative responses or a pre-defined list of negative responses.

12. The system of claim 3, wherein the first audio output, the second audio output, and the third audio output are selected from a library of stored audio outputs, wherein each of the stored audio outputs has a corresponding caller detector analysis.

13. The system of claim 12, wherein the first audio output, the second audio output, and the third audio output are randomly selected.

14. The system of claim 1, wherein the system is configured as a cloud infrastructure comprising a network interface configured to communicatively operate with electronic devices, and wherein the network interface implements a plurality of network protocols.

15. The system of claim 1, wherein the system is configured as a smartphone comprising a network interface configured to communicatively operate with remote computers located on cloud infrastructure, and wherein the network interface implements a plurality of network protocols.

16. The system of claim 1, wherein the system is configured as an infrastructure of a cell phone service provider comprising a network interface configured to communicatively operate with electronic devices, and wherein the network interface implements a plurality of network protocols.

17. The system of claim 1, wherein the first transcription or natural language processing data is generated via a speech recognition or natural language processing operation.

18. A computer-executed method comprising:

initiating a telephony or VOIP session with a caller telephony or VOIP device;

generating a first audio output over the telephony or VOIP session associated with a first caller detector analysis;

following the generating of the first audio output and in response to a first audio input being received, generating a first transcription or natural language processing data of the first audio input;

determining via the first caller detector analysis whether the first audio input is an appropriate response for a first context evaluated by the first caller detector analysis;

generating a second audio output over the telephony or VOIP session associated with a second caller detector analysis;

following the generating of the second audio output and in response to a second audio input being received, generating a second transcription or natural language processing data of the first audio input;

determining, via the second caller detector analysis, whether the second audio input is an appropriate response for a second context evaluated by the second caller detector analysis;

determining a score for the telephony or VOIP device; and initiating a second telephony or VOIP session with a user's telephony or VOIP device based on the determination, or directing the telephony or VOIP session with the caller telephony or VOIP device to end a call or to voicemail.

19. A computer-readable medium having instructions stored thereon, wherein execution of the instructions causes a processor to:

initiate a telephony or VOIP session with a caller telephony or VOIP device;

generate a first audio output over the telephony or VOIP session associated with a first caller detector analysis;

following the generating of the first audio output and in response to a first audio input being received, generate a first transcription or natural language processing data of the first audio input;

determine via the first caller detector analysis whether the first audio input is an appropriate response for a first context evaluated by the first caller detector analysis;

generate a second audio output over the telephony or VOIP session associated with a second caller detector analysis;

following the generating of the second audio output and in response to a second audio input being received, generate a second transcription or natural language processing data of the first audio input;

determine via the second caller detector analysis whether the second audio input is an appropriate response for a second context evaluated by the second caller detector analysis;

determine a score for the telephony or VOIP device; and initiate a second telephony or VOIP session with a user's telephony or VOIP device based on the determination, or direct the telephony or VOIP session with the caller telephony or VOIP device to end a call or to a voicemail.

* * * * *